(12) United States Patent
Weiss et al.

(10) Patent No.: US 7,267,055 B2
(45) Date of Patent: Sep. 11, 2007

(54) INKS FOR USE IN MEMBRANE IMAGE TRANSFER PRINTING PROCESS

(75) Inventors: Keith D. Weiss, Fenton, MI (US); Jason Beaudoin, West Bloomfield, MI (US)

(73) Assignee: Exatec, L.L.C., Wixom, MI (US)

( * ) Notice: Subject to any disclaimer, the term of this patent is extended or adjusted under 35 U.S.C. 154(b) by 0 days.

(21) Appl. No.: 10/734,758

(22) Filed: Dec. 11, 2003

(65) Prior Publication Data

US 2005/0126414 A1 Jun. 16, 2005

(51) Int. Cl.
*B41F 31/00* (2006.01)

(52) U.S. Cl. ............... 101/491; 101/170; 101/41

(58) Field of Classification Search ............ 101/170, 101/491, 492, 41
See application file for complete search history.

(56) References Cited

U.S. PATENT DOCUMENTS

| | | | | |
|---|---|---|---|---|
| 4,474,110 A | * | 10/1984 | Rosner | 101/170 |
| 4,531,122 A | * | 7/1985 | Redfield | 345/74.1 |
| 4,835,576 A | * | 5/1989 | Komori et al. | 355/40 |
| 4,910,070 A | * | 3/1990 | Al'Hariri | 428/181 |
| 5,380,806 A | * | 1/1995 | Yano | 525/481 |
| 5,456,743 A | * | 10/1995 | Fry | 524/21 |
| 5,727,459 A | * | 3/1998 | Shimokuni | 101/36 |
| 5,749,292 A | * | 5/1998 | De Bastiani et al. | 101/129 |
| 6,187,439 B1 | * | 2/2001 | Elwakil | 428/407 |
| 6,265,481 B1 | * | 7/2001 | Fries et al. | 524/594 |
| 6,284,161 B1 | * | 9/2001 | Thakrar et al. | 264/1.7 |
| 6,565,776 B1 | * | 5/2003 | Li et al. | 264/2.5 |
| 6,964,806 B1 | * | 11/2005 | Tazaki | 428/411.1 |
| 6,982,115 B2 | * | 1/2006 | Poulos et al. | 428/195.1 |
| 2001/0022783 A1 | * | 8/2001 | Stecker | 264/246 |
| 2003/0116047 A1 | | 6/2003 | Cutcher | |
| 2003/0224149 A1 | * | 12/2003 | Takada | 428/195.1 |
| 2003/0234848 A1 | * | 12/2003 | Ishikawa | 347/102 |

FOREIGN PATENT DOCUMENTS

| JP | 357170843 | * 10/1982 |
|---|---|---|
| JP | 58-102944 | * 6/1983 |

* cited by examiner

*Primary Examiner*—Daniel J. Colilla
*Assistant Examiner*—Marissa Ferguson
(74) *Attorney, Agent, or Firm*—Brinks Hofer Gilson & Lione

(57) ABSTRACT

The present invention involves an ink for transferring a printed image from a membrane to a substrate. The ink comprises a hydrocarbon solvent, a synthetic resin, and a thixotrope for forming a thixotropic network in the ink. The hydrocarbon solvent has a predetermined evaporation rate and the thixotropic network of the ink has a thixotropic network magnitude of between about $3 \times 10^4$ and $6 \times 10^5$ dynes/cm$^2$-sec$^{-1}$ and a thixotropic network strength of at least about 35.0 gm-cm.

11 Claims, 7 Drawing Sheets

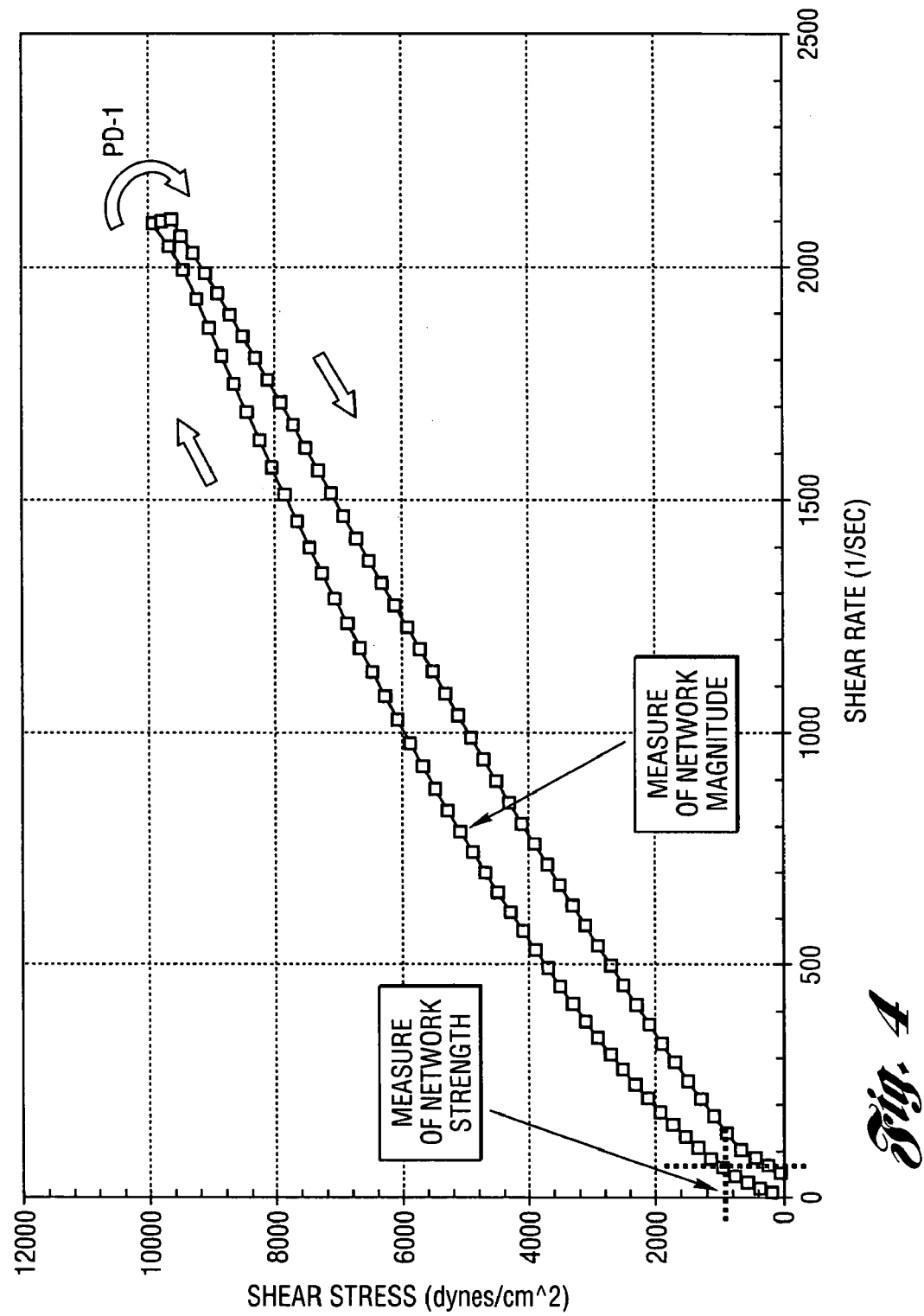

INKS FOR USE IN MEMBRANE IMAGE TRANSFER PRINTING PROCESS

TECHNICAL FIELD

This invention relates to inks that exhibit rheological properties within a specific range that make them amenable for use in printing processes including membrane transfer printing.

BACKGROUND

Molded plastic articles are becoming widely accepted as a replacement for metallic and glass articles. One advantage associated with molded plastic articles is the integration of several components into one article, thereby reducing the number of assembly operations. In other words, an article that previously was comprised of several components bonded or joined together may be manufactured in a one step, molding operation. One inherent problem that has resulted from the advent of this practice is the ability to print upon the resulting complex (concave, convex, etc.) surface shape of the article. Printing is desirable since other means for disposing images are timely and the use of several 2-dimensional printing concepts, namely screen-printing and pad-printing, have been extended to meet this need with only limited success.

Screen-printing is a known commercial process and is described in greater detail below. Screen printing is limited in the complexity of the surface upon which may be printed. This technique represents a very economical method for printing onto a "flat" substrate. Screen-printing has been applied to curved surfaces through the implementation of a technique known as in-mold decoration (IMD). In this technique the printed image is applied via screen-printing to a "flat" film. This film is then held via vacuum to the surface of the mold. The film becomes part of the surface of the article upon the injection of the plastic material into the mold. Major difficulties associated with the use of this technique are the registration of the decoration on the article's surface and a limitation in surface complexity of the article. Decoration registration requires accurate positioning of the film into the mold for each article reproduction. Surface complexity is limited by the ability of the film to conform (e.g., stretch) to the shape of mold to be incorporated as part of the article's surface.

Pad-printing is also a known commercial printing process and is described in greater detail below. Pad-printing is a printing process which uses a tampon and a cliché to stamp or print onto a convex curved surface. In fact, pad-printing or tampography is a form of indirect or offset gravure printing that is accepted by the automotive industry for the decoration of interior components. Pad or tampon printing is an economical technique capable of providing fine line (32 micrometer) resolution on both curved and uneven surfaces. However, this technique is limited in the degree of complex curvature, radius, and size of the substrate to be printed, as well as in the design of the substrate's edge up to which one may desire to print.

Significant differences between screen-printing and pad-printing exist with respect to the composition of the ink utilized. Typically, the inks used in these two application methods are very different in their solvent make-up. In order not to dry in the screen, the ink formulations used in screen-printing contain solvents whose evaporation rates are lower than those used in pad-printing inks. In pad-printing ink formulations, solvent evaporation is utilized to modify rheological properties and surface tension in order to provide a "tacky" film on the pad during transfer. Thus many commercial screen-printing and pad-printing inks will not optimally function in a printing process that combines both conventional printing techniques into one method, such as MIT printing.

Therefore, there is a need in the industry to formulate inks that not only may be used in conventional screen-printing or pad-printing application techniques, but also will function in processes that incorporate both conventional techniques into one process.

BRIEF SUMMARY OF THE INVENTION

The present invention provides inks which may be used in conventional screen-printing or pad-printing application techniques and membrane image transfer (MIT) printing.

In one embodiment, the present invention provides an ink for transferring a membrane image to a substrate. The ink comprises a hydrocarbon solvent, a synthetic polymeric resin, and a thixotrope for forming a thixotropic network in the ink. The hydrocarbon solvent has a predetermined evaporation rate and the thixotropic network of the ink has a thixotropic network magnitude of between about $3 \times 10^4$ and $6 \times 10^5$ dynes/cm$^2$-sec$^{-1}$ and a thixotropic network strength of at least about 35.0 gm-cm.

In another embodiment, the present invention provides a membrane image transfer article comprising a plastic substrate and an ink printed on the substrate. The ink has a thixotropic network including a thixotropic network magnitude of between about $3 \times 10^4$ and $6 \times 10^5$ dynes/cm$^2$-sec$^{-1}$ and a thixotropic network strength of at least about 35.0 gm-cm.

Other objects and advantages of the present invention will become apparent upon considering the following detailed description and appended claims, and upon reference to the accompanying drawings.

BRIEF DESCRIPTION OF THE DRAWINGS

FIG. 4 is a plot of shear stress versus shear rate for a pad-printing ink (# PD-1) depicting the thixotropic loop obtained in relation to the measured up-curve and down-curve;

ADDITIONAL BACKGROUND OF PRIOR ART

Figure 1:
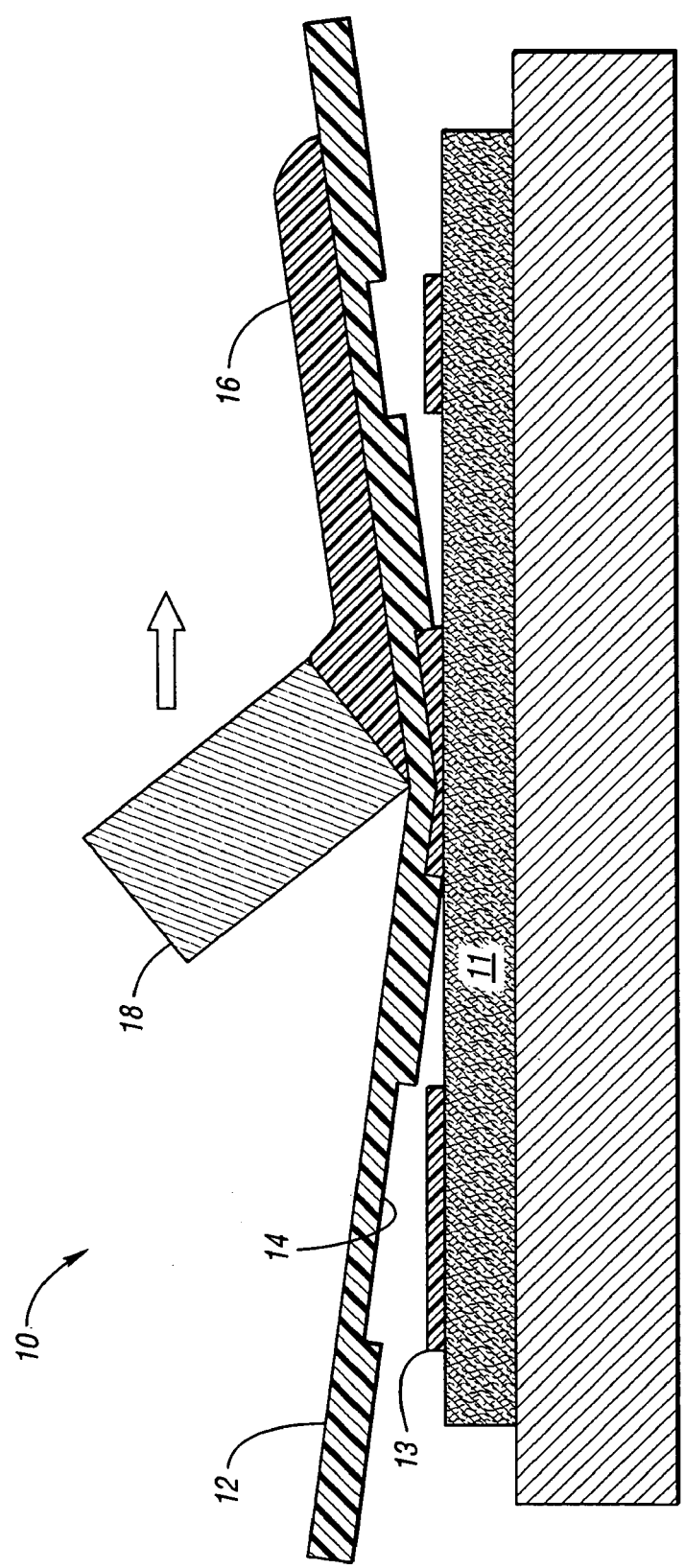
FIG. 1 is a schematic of a conventional screen-printing process utilizing a squeegee to push an ink through a screen mesh for deposition onto a flat substrate.

Screen-printing is a known commercial process. A schematic of a screen-printing process is shown in FIG. 1 and represented by reference numeral 10. Screen-printing process 10 is used to apply a print to a flat substrate 11 with uniform ink thickness. The process 10 involves the use of a screen 12 that exhibits an open mesh 14 in the shape of the desired graphic pattern. The screen 12 is positioned parallel to the substrate 11 to be printed at a specified off-contact distance. The screen is then flooded with ink 16, followed by the movement of a squeegee 18 across the surface of the screen. The downward pressure applied by the squeegee during this movement forces the ink through the open mesh representing the graphic pattern in the screen. After the squeegee passes a region, the tension of the stretched screen along with the off-contact distance between the screen and the substrate allows the screen to separate from the ink deposited in that region.

Figure 2:
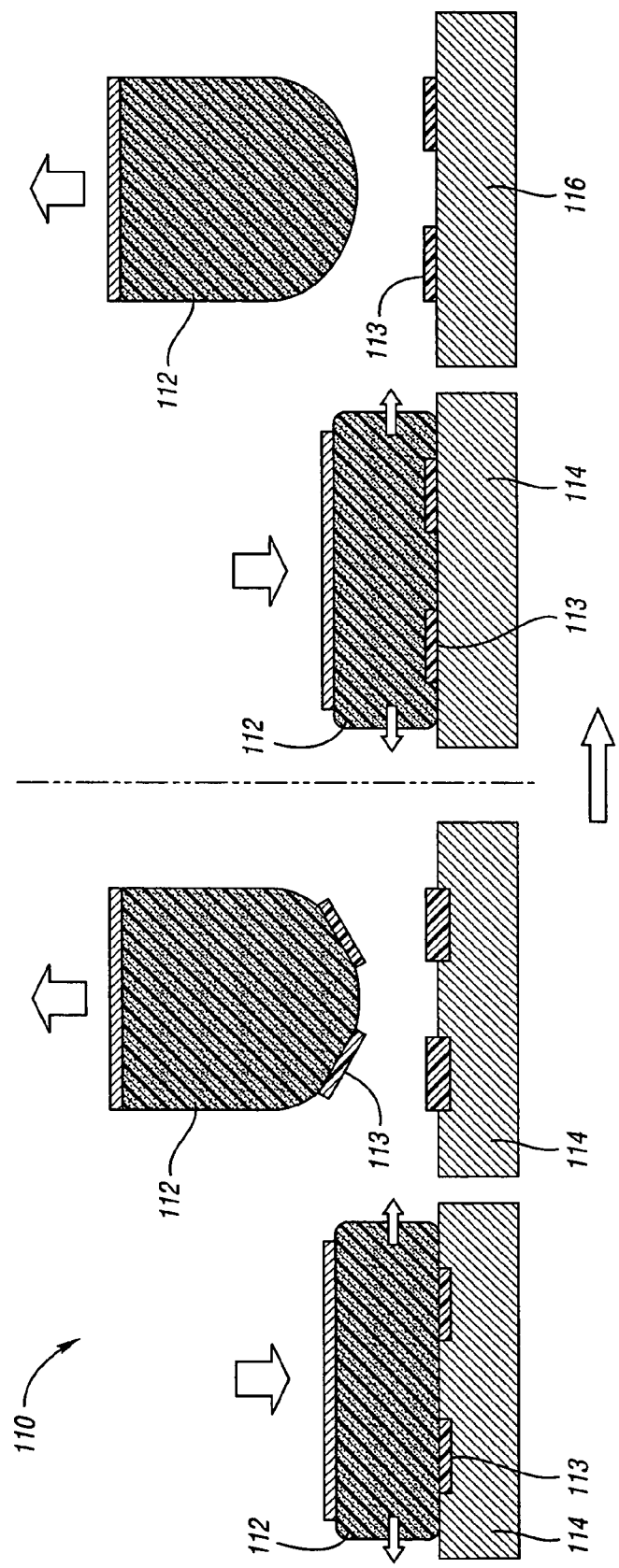
FIG. 2 is a schematic of a conventional pad-printing process including ink pick-up from an engraved cliché by a transfer pad followed by deposition of the ink onto a substrate via applied pressure.

In a typical pad-printing process, an engraved plate known as a cliché is flooded with ink. A schematic of a pad-printing process is shown in FIG. 2 and represented by reference numeral 110. Any excess ink on the cliché is removed through the use of a doctoring blade. A pad or tampon 112 is used to pick up ink 113 from a cliché 114. The tampon is then moved over to a substrate 116 that is to be printed. Upon contact with the substrate, the tampon is rolled across the substrate's surface. The ink 113 image is finally released from the tampon 112 as it is lifted off of the substrate 116. The pitch (thickness & angle) associated with the tampon 112 is highly dependent upon the shape and fragility of the substrate 116 to be printed. The pitch and shape (round, rectangular, or bar) of the tampon 112 are typically selected to achieve a rolling action when the ink 113 is picked up from the cliché 114 and deposited onto the substrate 116. Tampons with a flat profile are usually avoided due to their propensity to trap air between the tampon and substrate, thereby, causing a defect in the applied print.

DETAILED DESCRIPTION OF THE INVENTION

The following description of the preferred embodiment is merely exemplary in nature and is in no way intended to limit the invention or its application or uses.

The present invention provides inks and a method of printing the inks, such as a membrane image transfer (MIT) printing process. In one embodiment, the inks exhibit the rheological properties to achieve optimum performance in an MIT printing process. As described below, membrane image transfer printing incorporates both screen printing and pad printing components. One property associated with an ink that affects the quality of the print arising from membrane transfer printing has been found to be the extent to which the dispersed resins, pigments, and fillers in the ink establish intermolecular interactions with each other. These interactions were further found to manifest themselves in specific measurable ranges for magnitude and strength of the resulting 3-D structure to establish the degree of thixotrophy (structure), level of compliance (creep relaxation), relationship between storage and loss moduli (tan δ), and magnitude of an "apparent" yield stress for optimum performance in a MIT printing process.

In one embodiment, the present invention provides a membrane image transfer (MIT) printing process which uses inks that exhibit the rheological properties, thereby achieving a desired printing performance. An MIT printing process is a method of printing that combines both screen-printing and pad printing (tampography) into one method for the decoration of articles with complex shape. An example of the MIT printing process may be found in U.S. Patent Application Publication No. US2003/0116047A1, filed Dec. 19, 2002, which is incorporated herein.

Figure 3A:
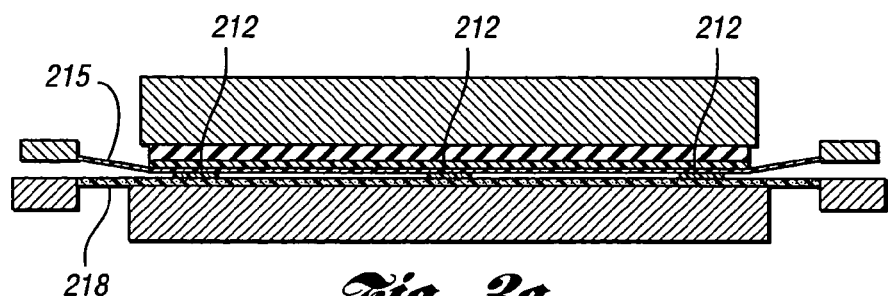
FIGS. 3a-3d are schematic diagrams of a membrane image transfer (MIT) process.
Figure 3B:
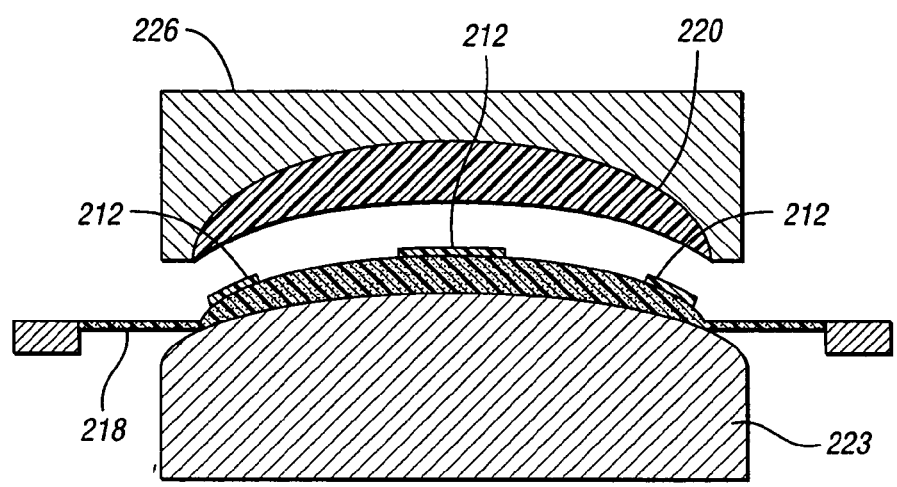
Figure 3C:
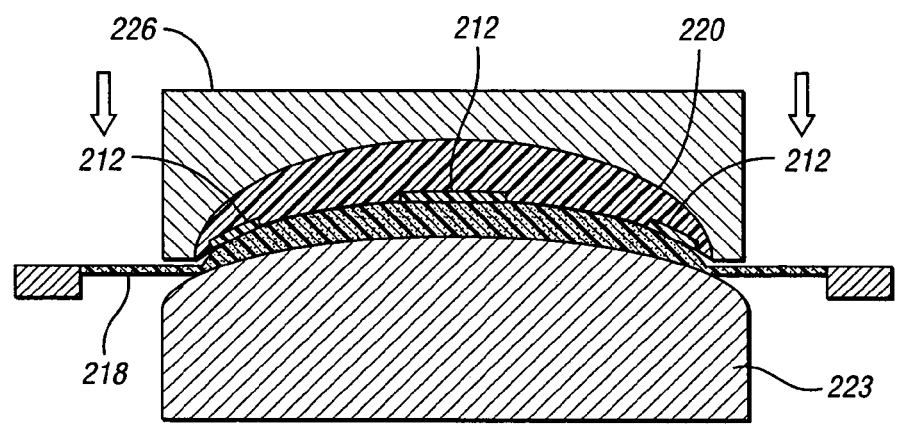
Figure 3D:
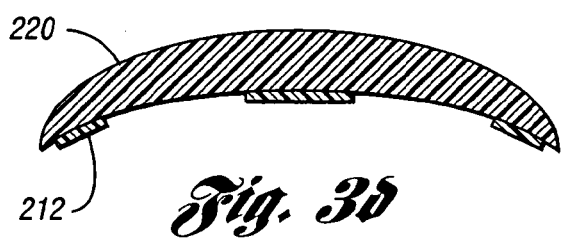

A schematic of an MIT process is shown in FIGS. 3a-3d. MIT printing offers the ability to print articles with complex shape with the print resolution and opacity normally obtained with screen-printing on flat substrates. As shown in FIGS. 3a-3d, ink is used in membrane image transfer (MIT) printing. In this embodiment, a printed decoration 212 is applied through a screen 215 to a flat "soft" membrane 218 via the use of conventional screen-printing as mentioned above and depicted in FIG. 3a. The membrane 218 is then deformed or reshaped to the geometry of the surface of an article 220 through the use of a form fixture 223 resembling the mirror image of the article 220 as depicted in FIG. 3b. The deformed membrane 218 and the article 220 held in a part fixture 226 are then pressed together in forced contact as depicted in FIG. 3c. The application of pressure between the article 220 held in part fixture 226 and the formed membrane 218 results in the transfer of the screen-printed image from the membrane 218 to the article 220 as depicted in FIG. 3d.

It has been found that few inks are suitable for use in a membrane transfer printing process. More specifically, MIT printing process amenable inks must exhibit a specific degree of intermolecular interactions typically not present in many inks used for either conventional screen printing or pad printing applications. It has been discovered that about 50% of ink systems are not compatible for use with MIT printing in that they do not provide good print quality or exhibit limited print transfer from the membrane to the plastic substrate. In order for the MIT process to be robust, an ink is preferably amenable to performing over a wide time that can occur between applying a printed image to a flexible membrane, deforming the membrane to the shape of the substrate, and transferring this image from the membrane to a substrate. Only 6 out of 12 screen printing (ink #s SC-1 to SC-7) and pad printing (ink #s PD-1 to PD-5) inks sold for their performance in printing on plastic substrates were found to exhibit acceptable performance. These inks were applied to a polycarbonate substrate via a membrane image transfer (MIT) printing process with between 25 to 60 seconds of time between printing the pattern onto a membrane and transferring this print (e.g., TH, transfer hold=15-35 seconds+PTT, print transfer time=10-25 seconds) to a substrate. More specifically, only four screen printing inks (#s SC-1, SC-3, SC-4, & SC-7) and two pad printing inks (#s PD-4 & PD-5) were found to meet all of the desired printing parameters, e.g., ink transfer (%), print thickness (µm), opacity (%), adhesion retention (%), and print resolution (1-10 subjective scale), as shown in Table 1. The screen printing and pad printing inks that failed to meet the specification were found to fail not in just one requirement, but rather fail in multiple categories. In addition, each ink that failed was observed to fail both at the low transfer time of 25 seconds and the high transfer time of 60 seconds.

In order to minimize the down-time associated with having to clean the printing apparatus a minimum amount of 98.0% of the ink is preferably transferred from the membrane to the part being printed. Excessive residue left on the membrane would adversely affect the next print, thereby, causing excessive scrap and a low yield of acceptable printed parts. The thickness of the print for printing onto a plastic substrate in order to enhance opacity and minimize any adverse affect on the application of a protective overcoat to the printed part is preferably between 4.0 µm and 9.0 µm. The overall opacity of the print is expected to about 99.85% to minimize any unacceptable perception by the consumer regarding the quality of the print. Furthermore, the ink is expected to tenaciously adhere to the substrate upon which it is printed with a retention of a least 99.0% after being subjected to a standard cross-hatch/tape pull test. Finally, the resolution of the print is preferably of the quality where fine details and edge sharpness is well defined. Optical inspection of each print can be used to establish an arbitrary scale of 1-10 with 10 being a "perfect" print. Within this arbitrary scale the resolution of a print is expected to be greater than or equal to a rating of 7.

applied level of shear stress), form a loose three dimensional network or structure sometimes referred to as clusters or flocculates. However, when a shearing force is applied to this structure, the network can be disrupted or broken over a period of time, thereby allowing the ink to freely flow. When the shearing force is removed, this loose network will once again reform over a period of time. The rates at which the structure can be broken and reformed typically are different from one another, which results in the occurrence

TABLE 1

| | INK TRANSFER (%) | | Print Thickness (μm) | | Opacity (%) | | Adhesion Retention (%) | | Print Resolution (1-10 arbitrary scale) | |
|---|---|---|---|---|---|---|---|---|---|---|
| | 25 sec PTT; 35 sec TH | 10 sec PTT; 15 sec TH | 25 sec PTT; 35 sec TH | 10 sec PTT; 15 sec TH | 25 sec PTT; 35 sec TH | 10 sec PTT; 15 sec TH | 25 sec PTT; 35 sec TH | 10 sec PTT; 15 sec TH | 25 sec PTT; 35 sec TH | 10 sec PTT; 15 sec TH |
| Screen Printing Inks | | | | | | | | | | |
| SC-1 | Pass | Pass | Pass | Pass | Pass | Pass | Pass | Pass | Pass | Pass |
| SC-2 | Fail | Fail | Pass | Pass | Pass | Fail | Pass | Pass | Fail | Fail |
| SC-3 | Pass | Pass | Pass | Pass | Pass | Pass | Pass | Pass | Pass | Pass |
| SC-4 | Pass | Pass | Pass | Pass | Pass | Pass | Pass | Pass | Pass | Pass |
| SC-5 | Pass | Fail | Fail | Pass | Pass | Pass | Pass | Pass | Fail | Fail |
| SC-6 | Fail | Fail | Fail | Fail | Fail | Fail | Pass | Pass | Fail | Fail |
| SC-7 | Pass | Pass | Pass | Pass | Pass | Pass | Pass | Pass | Pass | Pass |
| Pad Printing Inks | | | | | | | | | | |
| PD-1 | Fail | Pass | Pass | Pass | Pass | Fail | Fail | Fail | Fail | Fail |
| PD-2 | Pass | Pass | Pass | Fail | Pass | Fail | Pass | Pass | Fail | Fail |
| PD-3 | Pass | Fail | Fail | Fail | Pass | Pass | Pass | Pass | Fail | Fail |
| PD-4 | Pass | Pass | Pass | Pass | Pass | Pass | Pass | Pass | Pass | Pass |
| PD-5 | Pass | Pass | Pass | Pass | Pass | Pass | Pass | Pass | Pass | Pass |
| | Pass ≥ 98.0% FAIL < 98.0% | | 4.0 μm < Pass < 9.0 μm FAIL < 98.0% | | Pass ≥ 99.85% FAIL < 99.85% | | Pass ≥ 99.0% FAIL < 99.0% | | Pass ≥ 7 FAIL < 7 | |

The ink systems that are compatible with a MIT printing process were surprisingly found to exhibit a specific range of thixotropic, compliance, dynamic, and yield stress properties as described in Table 2. Each of these properties is related in that they are known to have a strong correlation with the degree of viscoelasticity exhibited by a pigment-filled material, such as an ink or coating. The viscoelastic properties associated with the ink formulations arise from the degree of association present between dispersed pigments, fillers, and resins present in the ink formulation. Each of the properties described in Table 1 can be measured by a variety of standard rheological tests well known in the art. Each of these measured properties support the other properties by their relationship to the thixotropic structure formed in the ink at rest (shear rate=0 $sec^{-1}$). The main difference between each of the measured properties is the time scale over which the measurement is made.

TABLE 2

| | Preferred Range |
|---|---|
| Thixotropic Network Magnitude, TNM (dynes/$cm^2$-$sec^{-1}$) | $3.5 \times 10^4 \leq TNM \leq 6.0 \times 10^5$ |
| Thixotropic Network Strength, TNS (gm-cm) - torque required to achieve 100 $sec^{-1}$ | $350 \leq TNS$ |
| Creep Viscosity, $\eta_{J[t]}$ (Poise) | $8.0 \times 10^2 \leq \eta_{J[t]} \leq 9.0 \times 10^4$ |
| Creep Recovery, CR (%) | $5.0 \leq CR$ |
| Tan δ (dimensionless) | $1 \leq Tan\ \delta$ |
| Static Yield Stress, τ (dynes/$cm^2$) | $1.0 \leq \tau \leq 50.0$ |

The degree of thixotrophy exhibited by an ink is dependent upon the nature and type of structure or network established in the ink under static conditions. A thixotropic network is defined as a suspension of particles (e.g., pigments, resins, fillers, etc.) that at zero or low shear rates (low of a hysteresis (thixotropic loop) in a graphical plot of applied shear stress versus shear rate. More specifically, the breakdown of the structure typically lags behind the increasing shear rate (up curve), thereby, allowing the ink to exhibit a viscosity that is higher than the equilibrium viscosity exhibited by the ink at a given shear rate. As the shear rate decreases (down curve), the rebuilding of the network lags behind the decrease in shear rate, thereby, allowing the ink to exhibit a viscosity that is lower than the equilibrium viscosity for a given shear rate. This phenomenon of thixotrophy as exhibited by ink # PD-1 is depicted in FIG. 4. Thus the preferred characteristics encompassed by the thixotropic behavior of an ink over a long time scale include both shear thinning ability (breakdown) and time dependency (rebuilding). These characteristics are controlled by two physical parameters associated with a thixotropic network, namely, the magnitude or size of the structure and the strength of the inter-particle attraction or bonding between particles with in this structure.

The presence of a 3-D structure (thixotropic network) imparts a degree of rigidity to the ink, thereby reducing particle settling during storage of an ink (screen-printing or pad-printing) after manufacturing. The magnitude and strength of the thixotropic network has a different degree of importance in pad-printing inks than it does in screen-printing inks. During screen-printing one desires the ink to flow through the screen for deposition on the article. In this respect, the structure is broken down via the stress applied to the ink via the squeegee. The "building" of viscosity during film formation on the article is assisted by the reforming of this thixotropic structure or network. However, since the surface energy of the article is usually greater than the surface tension exhibited by the ink, the article's surface is satisfactorily "wet" by the ink. In pad-printing inks, the pick-up of the ink form the cliché by a low surface energy pad, including the presence of a much higher level of thixotrophy. In this situation, the surface energy of the silicone pad is lower than the surface tension exhibited by the ink, thereby, inhibiting successful wetting or spreading of the ink onto the surface. A rapid change in viscosity is preferred to maintain the structure of the print on the pad until transfer to a substrate can be made. If this high degree of thixotrophy is not present, the ink on the pad will contract or "crawl", thereby affecting the quality of the print.

It has been observed that pad-printing inks exhibit a thixotropic network that is typically much larger in magnitude than the network found in screen-printing inks. On average, the magnitude of the network in pad-printing inks is double the magnitude of the network present in screen-printing inks. As shown in FIG. 4, the magnitude of a thixotropic loop is measurable as the area encompassed by the up-curve and down-curve of an ink in a thixotropic loop test. It has been found that in order to provide a preferred print resolution and ink transfer in the membrane image transfer (MIT) process, a thixotropic network magnitude between 35,000 dynes/cm$^2$-sec$^{-1}$ to 600,000 dynes/cm$^2$-sec$^{-1}$ is preferably present. Ink #s SC-5, SC-6, PD-1, and PD-3 were found to exhibit a network magnitude outside the identified range, thereby, making these inks unsuitable for a MIT printing process.

It has been observed that screen-printing inks exhibit approximately double the level of applied torque than required by pad-printing inks in order to establish the same shear rate condition in each type of ink. Thus although the magnitude of the thixotropic network in screen-printing inks is smaller than that in pad-printing inks, the strength of the network in screen-printing inks is much higher. A depiction of using the level of torque to reach a shear rate of 100 sec$^{-1}$ as a measure of network strength is shown in FIG. 4. The addition of a catalyst or promotion of cross-linking in an ink would cause the strength of the thixotropic network present in the ink to further increase with time. It has been found that in order to provide a preferred print resolution and ink transfer in the membrane image transfer (MIT) process, a thixotropic network strength greater than or equal to about 35 gm-cm is preferred to achieve a shear rate of 100 sec$^{-1}$. Ink #s SC-5, PD-1, and PD-2 were found to exhibit a network strength that is outside the identified range making these inks unsuitable for use in a MIT printing process.

The thixotrophy exhibited by an ink can also be explored via the application of a small continuous stress (e.g., 10 dynes/cm$^2$) over a long period of time while monitoring the resulting displacement. This test method (e.g., Creep/Relaxation), which simulates the leveling and slumping behavior that can occur during film formation, provides an effective means to probe the viscoelastic properties exhibited by an ink at low shear rates (about $10^{-1}$ to $10^{-5}$ sec$^{-1}$). The removal of the applied stress after an equilibrium displacement is reached provides a means to monitor the relaxation displacement associated with the thixotropic structure. In this way the extent to which the elastic properties of the ink can recover from the forced deformation can be determined. This relates to the rebuilding of the network or structure previously described to occur for a thixotropic fluid.

Figure 5:
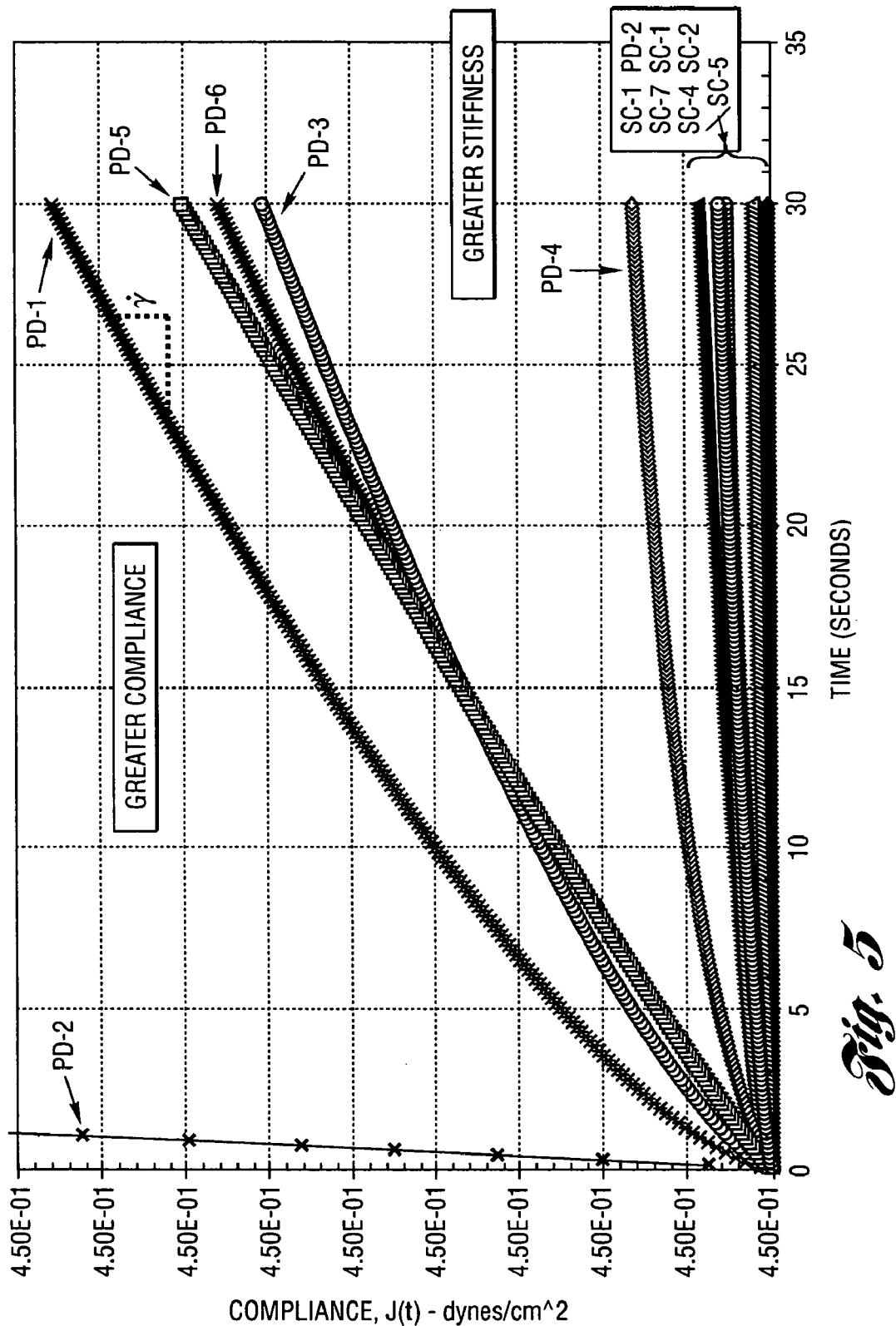
FIG. 5 is plot of compliance J(t) versus time for multiple screen-printing (ink #s SC-1 to SC-7) and pad-printing (ink #s PD-1 to PD-5) ink formulations depicting the degree of stiffness exhibited by each ink formulation.

The creep curves obtained for various screen printing and pad printing inks upon plotting compliance, J(t), versus time are shown in FIG. 5. In general the curved structure of the creep curves is a strong indication that each of the inks is a weak viscoelastic fluid. The larger compliance value exhibited by each pad printing ink at a given time interval further indicates that these inks are more compliant than screen printing inks. In other words, screen printing inks on average exhibit a greater degree of stiffness than pad printing inks. This result supports the higher degree of torque preferred by a screen printing ink to reach a specific shear rate as previously described for a standard thixotropic loop test.

The equilibrium viscosity exhibited by screen printing inks at the ultra low shear rates can easily be established in a Creep Compliance test. The viscosity of each ink is determined via linear regression analysis of the compliance data obtained during the 15 to 30 second time frame. The Creep viscosity is defined as the ratio of applied stress to the slope (shear rate) of the compliance curve in this region. The Creep viscosity for screen printing inks was observed to be significantly higher than that exhibited by pad printing inks. More specifically, the average viscosity of the screen printing inks was observed to be on the order of 76,000 Poise as compared to 2,100 Poise for pad printing inks. It has been found that in order to provide optimum print resolution and ink transfer in the membrane image transfer (MIT) process, the Creep viscosity (at ultra low shear rates) exhibited by an ink is preferably between $8.0 \times 10^2$ and $9.0 \times 10^4$ Poise. Ink #s SC-2 and PD-2 were found to exhibit a Creep viscosity outside this specified range, thereby, making these inks unsuitable for use in a MIT printing process.

Upon removal of the applied stress in the creep test, the relaxation displacement that occurs can provide an estimate of the extent to which the elastic properties exhibited by an ink can be recovered. It has been found that screen printing inks were able to recover approximately three times more of their elastic properties than was possible for pad printing inks. It has been discovered that in order to provide a preferred print resolution and ink transfer in the membrane image transfer (MIT) process, an ink is preferably capable of recovering greater than about 5% of its structure that was deformed in a standard creep & relaxation test. Ink #s SC-6 and PD-2 were found to exhibit a recovery percentage below the identified range, thereby, making these inks unsuitable for use in a MIT printing process.

Figure 6:
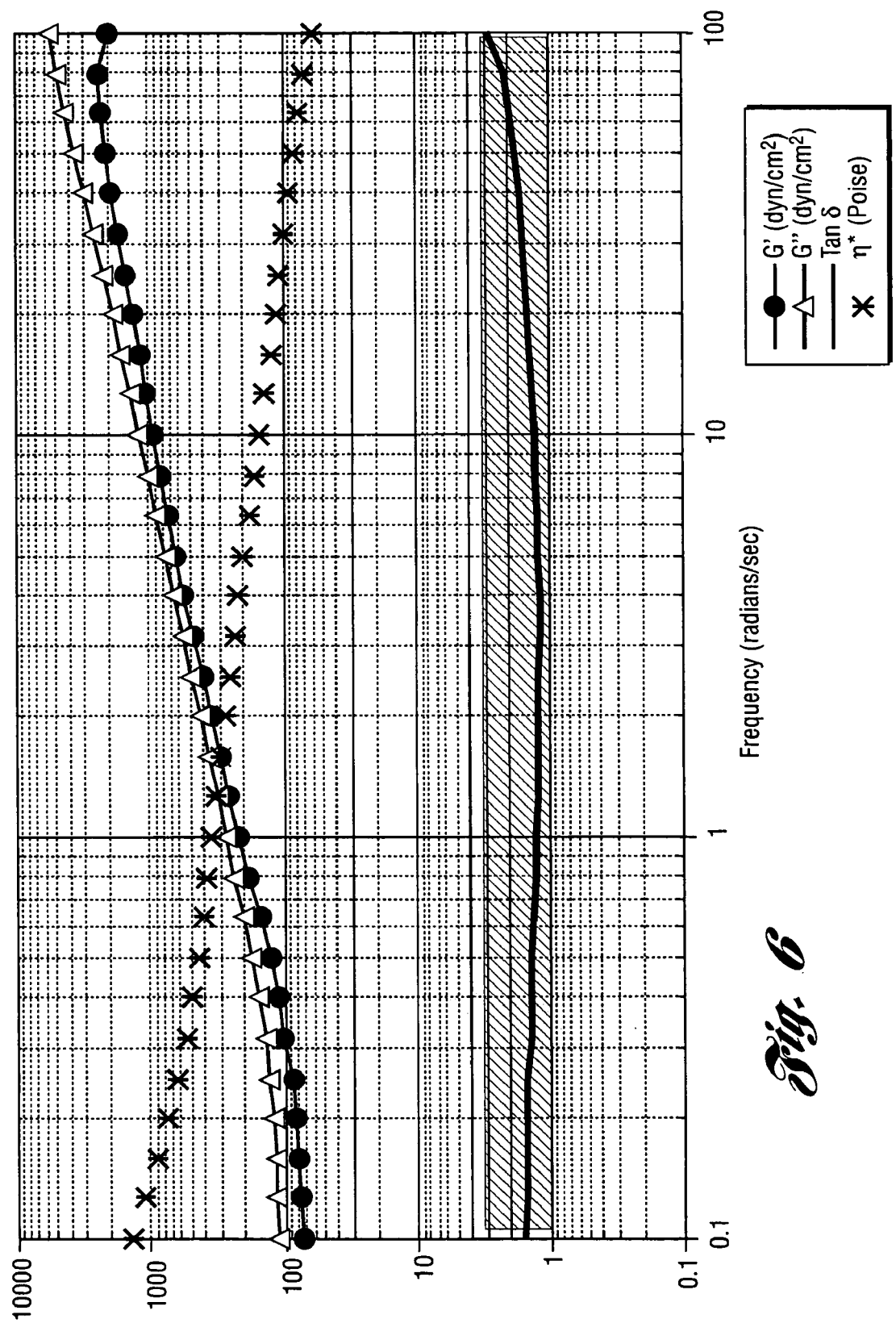
FIG. 6 is a plot of the shear modulus (G'), loss modulus (G"), tan δ (ratio of G"/G'), and complex viscosity (η*) exhibited by screen-printing ink # PD-4 as a function of frequency.

Significant information concerning the particle to particle interaction in the structure or network present in an ink can be obtained through the use of dynamic oscillatory measurements over a frequency range between 0.1 to 100 radians per second. In this type of standard rheological test, the material is subjected to a sinusoidal deformation of stress or strain of small amplitude. This test probes the interaction between particles, while the material is at rest (shear rate =0 sec$^{-1}$) and within the linear viscoelastic region. These interactions are determined by the resulting relationship between the measured storage and loss moduli exhibited by the ink over the indicated frequency range. The storage modulus, G', is a measure of elasticity exhibited by the ink, while the loss modulus, G", is a measure of the viscous effects exhibited by the ink. The ratio of these moduli (G"/G'), typically referred to as Tan δ provides a numerical means of determining the nature of the interaction between the particles in a network. If the Tan δ ratio is greater than 3, the degree of association between particles is minimal. In other words, the particles are very weakly associated or unassociated with each other in this regime. If the Tan δ is less than 1, the particles are highly associated with each other. In other words, the interaction between the particles in this regime is quite strong as would be expected for many "gelled" materials. Finally, the interim region where Tan δ is greater than 1 and less than 3 is occupied by networks in which the particles are moderately or weakly associated with each other as shown in FIG. 6 for ink # PD-4. It has been have found that in order to provide optimum print resolution and ink transfer in the membrane image transfer (MIT) process, the Tan δ exhibited by the ink formulation is preferably greater than about 1 as indicated for a weakly associated particle network. Ink #s SC-2, SC-5 and PD-2 were found to exhibit a Tan δ less than 1, indicating a strong interparticle interaction, thereby, making these particular inks unsuitable for use in a MIT printing process.

Figure 7:
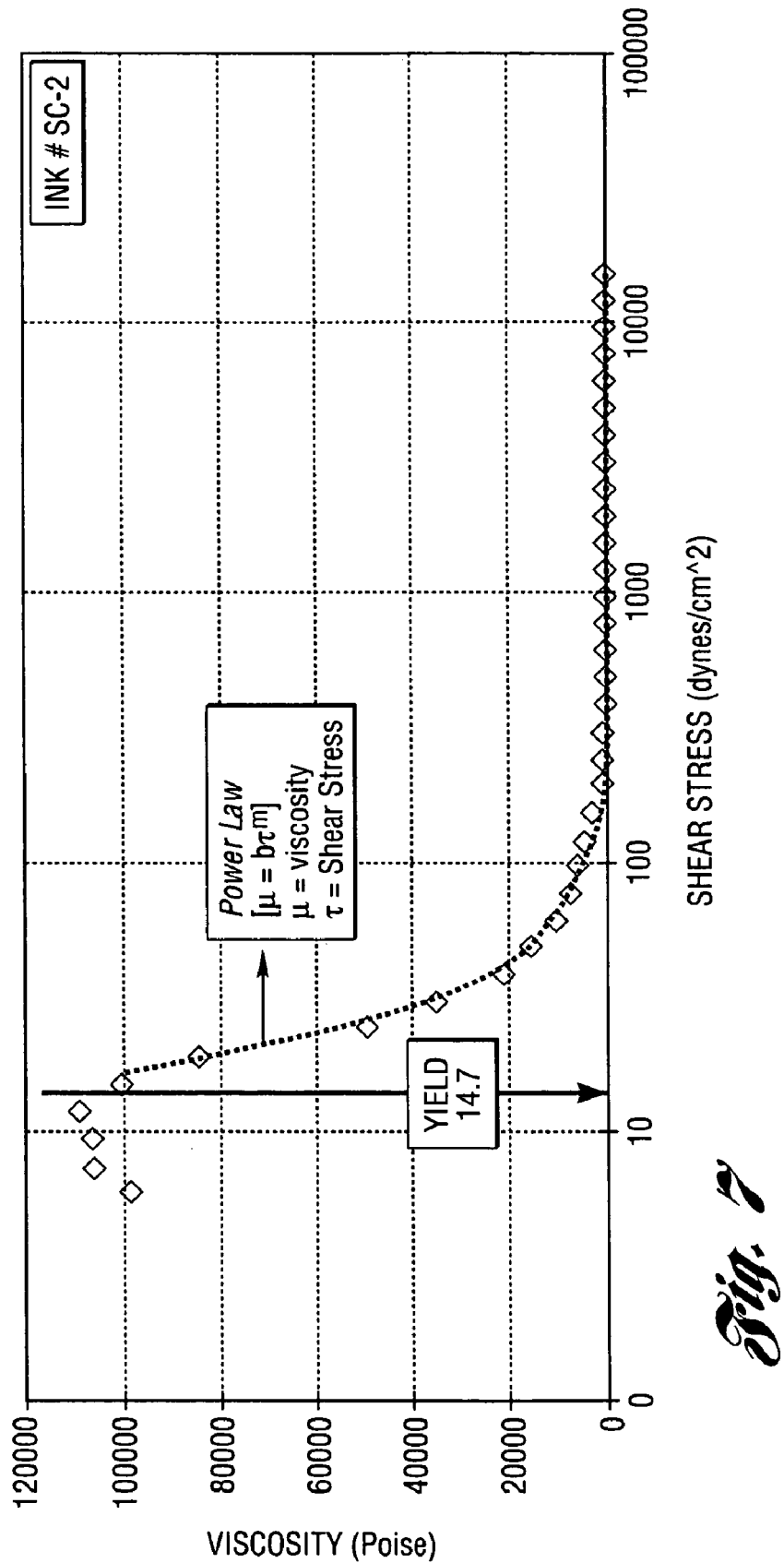
FIG. 7 is a plot of viscosity versus applied shear stress measured for Screen-Printing ink # SC-2 that demonstrates the occurrence of a static yield point and the ability to model the measured flow data with a Power Law function.

In order for any fluid containing dispersed particles, such as an ink, to begin to flow a certain level of stress is preferably applied in order to overcome what is commonly called an "apparent" static yield stress. The application of a stress smaller than the yield stress value will not lead to any permanent deformation of the thixotropic network. In this regime, the interaction between the particles within the network is greater than the applied stress. However, once the stress level applied to the ink exceeds the yield stress value exhibited by the thixotropic fluid, the breakdown of the networked structure begins to occur and flow is initiated. The yield stress can be empirically obtained by plotting the measured viscosity of the ink as a function of shear stress as shown in FIG. 7 for ink # SC-2. At low levels of applied stress or prior to yielding, the measured viscosity is observed to increase until a peak is reached at the static yield stress point. Upon the application of a stress level surpassing this "apparent" yield point, the viscosity of the ink is observed to decrease. The "apparent" static yield stress exhibited by an ink has a direct relationship with several key properties of the ink, such as leveling and sagging during film formation and sedimentation during storage.

Screen-printing inks were observed to exhibit an "apparent", static yield stress that is approximately twice the magnitude as the yield stress exhibited by pad printing inks. More specifically, it has been found that for an ink to provide a preferred print resolution and optimum amount of ink transferred from the membrane to a plastic substrate in a MIT process, the static yield stress must be within the range of 1.0 dynes/cm$^2$ to 60.0 dynes/cm$^2$.

All fluids containing dispersed particles, such as an ink, are typically referred to as Non-Newtonian or "shear-thinning" fluids. Once flow is initiated, the viscosity exhibited by these fluids is known to decrease as the shear rate to which the fluid is exposed increases. The viscosity exhibited by a fluid is defined as a measure of a fluid's resistance to flow. In such, viscosity reflects the rate at which a fluid can dissipate deformational energy through flow. The shear rate encountered by the fluid will be increased by the application of a higher level of torque to the test cell, which also results in an elevation of the stress applied to the fluid. The viscosity exhibited by an ink after yielding to flow has occurred can be modeled using a Power law function. The magnitude of the change in viscosity from flow initiation to that established at a high stress level is typically used to define the shear-thinning characteristics of the fluid. A ratio of the viscosity exhibited by the fluid after surpassing the static yield point for the fluid to the viscosity exhibited by the fluid upon being subjected to a high level of stress (e.g., 10,000 dynes/cm$^2$) can be used to characterize the degree of shear-thinning behavior. Screen printing inks have been observed to exhibit a shear thinning ratio that is approximately an order of magnitude greater than the ratio exhibited by pad printing inks. It has been found that ink formulations useful in membrane transfer printing typically exhibit a shear thinning ratio that is between about 4 to 6,000.

The viscosity exhibited by both screen printing inks and pad printing inks on average were observed to converge toward 10 Poise when exposed to a high stress level (>10,000 dynes/cm$^2$). The viscosity exhibited by screen printing inks at stress levels below 10,000 dynes/cm$^2$ were observed to be approximately double that exhibited by pad printing inks. It has been found that ink formulations useful in membrane transfer printing typically exhibit a viscosity less than or equal to 10.0 Poise at an applied shear stress of 1,000 dynes/cm$^2$ (at 25° C.).

Each of the inks (Ink #s SC-1, SC-3, SC-4, SC-7, PD-4, & PD-5) that were found to be suitable for use in a MIT printing process were found to meet all of the criteria specified in Table 2. The inks (Ink #s SC-2, SC-5, SC-6, PD-1, PD-2, & PD-3) that were found not to be suitable for use in a MIT printing process were found to exhibit more than one property outside the limits specified in Table 2. More specifically, each ink that was found to be unsuitable for use in a MIT printing process was observed to exhibit between 2-5 properties out of six specified properties that were outside the limits as summarized in Table 3. Thus the thixotropic structure established in about 50% of the inks available for either screen printing or pad printing onto plastic substrates were found to be unsuitable for application via a MIT printing process.

TABLE 3

| | Thixotropic Loop Area (dynes/cm$^2$ - sec$^{-1}$) | T (gm - cm) at γ = 100 sec$^{-1}$ | Creep Viscosity (Poise) | Recovery(%) | Tan δ | Yield Stress (dynes/cm$^2$) | OVERALL |
|---|---|---|---|---|---|---|---|
| | see EXAMPLE 3 | see EXAMPLE 3 | see EXAMPLE 4 | see EXAMPLE 4 | see EXAMPLE 5 | see EXAMPLE 6 | |
| | REQUIRED RANGE TO FUNCTION IN MIT PRINTING PROCESS [with-in range = √ & outside range = OUTSIDE] | | | | | | |
| SC-1 | √ | √ | √ | √ | √ | √ | IN RANGE |
| SC-2 | √ | √ | OUTSIDE | √ | OUTSIDE | √ | OUTSIDE |
| SC-3 | √ | √ | √ | √ | √ | √ | IN RANGE |
| SC-4 | √ | √ | √ | √ | √ | √ | IN RANGE |
| SC-5 | OUTSIDE | OUTSIDE | √ | √ | OUTSIDE | √ | OUTSIDE |
| SC-6 | OUTSIDE | √ | √ | OUTSIDE | √ | √ | OUTSIDE |
| SC-7 | √ | √ | √ | √ | √ | √ | IN RANGE |
| PD-1 | OUTSIDE | OUTSIDE | √ | √ | √ | √ | OUTSIDE |
| PD-2 | √ | OUTSIDE | OUTSIDE | OUTSIDE | OUTSIDE | OUTSIDE | OUTSIDE |
| PD-3 | OUTSIDE | OUTSIDE | √ | √ | √ | OUTSIDE | OUTSIDE |
| PD-4 | √ | √ | √ | √ | √ | √ | IN RANGE |
| PD-5 | √ | √ | √ | √ | √ | √ | IN RANGE |
| Totals | 67% IN RANGE 33% OUTSIDE | 67% IN RANGE 33% OUTSIDE | 83% IN RANGE 17% OUTSIDE | 83% IN RANGE 17% OUTSIDE | 75% IN RANGE 25% OUTSIDE | 83% IN RANGE 17% OUTSIDE | 50% IN RANGE 50% OUTSIDE |

The thixotropic network or flocculated structure present in the ink formulation may be formed through the use of a variety of different mechanisms known to those skilled in the art. The primary types of interactions are either electrostatic (e.g., attraction/repulsion) or physical, which typically includes polymeric entanglement, colloidal connectivity, and pigment flocculation or aggregation. These thixotropic mechanisms can be accomplished by many different thixotropes commonly used in solvent-borne inks and coatings. These thixotropes include castor oil derivatives, high molecular weight polyolefins, attapulgites, montmorillonite and other organo-clays, fumed silicas, fibrated minerals, calcium sulphonate derivatives, polyamide resins, polyester amides, alkyds and oil-modified alkyds, ionic surfactant-type agents, and non-ionic surfactant-type agents, among others.

Fumed silicas function as thixotropes through the formation of loose networks of bonded chains that increase resistance to flow through entanglement with each other. In this system the "bonding" to form a chain structure is usually through hydrogen bonding of hydroxyl functionality or the interaction of other functionality (e.g., alkyds, —NH groups, polymeric silanes, etc.) obtained through surface treatment or activation. An entangled structure may also be formed by the dispersion of short-fibered organics (e.g., asbestos, polyolefin, cellulosic, acrylic, plyaramid, etc.), hydrogenated castor oil derivatives, and high molecular weight polyolefins (e.g., calcium sulphonate-based derivatives, etc.). High molecular weight polyolefin chains tend to associate through weak Van der Waal attractive forces. Polyolefins are very associative when used at high levels. These thixotropes usually have to be dispersed in the ink or coating under heat to achieve full efficiency. Hydrogenated castor oil derivatives must also be incorporated in this fashion.

Organo-clay thixotropes function via hydrogen bonding that occurs between the edges of multiple pigment platelets. Each platelet also contains a long chain organic compound typically bonded to its surface. The long organic chains function to keep individual platelets apart from each other. Examples of organo-clays include hectorite, $(Mg,LI)_3Si_4O_{10}(OH)_2$, clays and bentonite, $Al_2O3-4SiO_2-2H_2O$, clays reacted with quaternary ammonium salts. Other types of clays, such as attapulgite clays, function in the same manner although they do not form platelets, but rather acicular or needle-shaped crystallites.

Polyester amides functionality as a thixotrope resides on their ability to form micelles and reverse micelles due to the association of either their hydrophobic or hydrophilic end groups with the surface groups on either the pigment particles or secondary filler particles. Thus depending upon the surface functionality of the pigment or filler surface thixotrophy is generated either by hydrogen bonding or chain entanglement.

Other additives, such as non-ionic and ionic surfactants, can also be utilized to form thixotropic structures through aggregation with either pigments or secondary colloidal fillers present in the ink formulation. Examples of these surfactants include base neutralized fatty alcohol sulfates, long chain polyamino-amide phosphates, and the slats of high molecular weight carboxylic acids among others known to those skilled in the art. These surfactants may build a structure through a variety of mechanisms, such as hydrogen bonding, chain entanglement, or electrostatic attraction.

Thixotropes may be incorporated into an ink via a variety of mixing or dispersion methods known to those skilled in the art. Examples of such methods include high speed impeller equipment, ball mills, and attritor mills among others. The usage level for a thixotrope may vary between about 0.1% to about 10.0 wt. % of the total ink or coating weight with about 0.3% to about 5% being preferred. Multiple types of thixotropes may be utilized within any given ink formulation.

An ink typically will consist of a combination of resins, solvents, pigments, and various other additives, such as thixotropes, film forming aids, dispersants, and catalysts or curing agents. Any combination of these components, as well as the incorporation of other additives (e.g., biocides, etc.) is possible provided the rheological property ranges specified in Table 2 are achieved. Any resin system known to those skilled in the art can be utilized. The inks that were found to meet preferred properties for successful use in a MIT printing process contained a variety of different classes of resins, such as polycarbonate (ink # SC-1), vinyl-PVC (ink # SC-3), polyester (ink # SC-4), vinyl-polyester (ink # PD-4), and acrylic (ink #s PD-5), as well as mixtures of various resins, e.g., polycarbonate/polyester mixture (ink # SC-7). Similar resin systems were observed to pass as well as fail in the successful application of a print via MIT processing. For examples, an acrylic system in ink # PD-5 passed all criteria, while similar acrylic resin systems in ink #s SC-2 & SC-6 failed to meet the specification. Resin systems, such as vinyl, acrylic, cellulosic, alkyds, polycarbonate polyester, formaldehyde, epoxy, polyurethanes, silicone/silicates, amino, polyamides, and phenolics among others may be utilized. Depending upon the type of resin system present in the ink the formulation may require the addition of a catalyst or curing agent, such as but not limited to isocyanates, metal driers (e.g., dibutyl tin dilaurate, zinc naphtenate, etc.), acids (e.g., phosphoric acid, acid ethyl phosphate, etc.), bases (e.g., nonyl phenol, benzyl dimethylamine, etc.), or peroxides (e.g., methyl ethyl ketone peroxide, cumene peroxide acetylacetonates of zinc, etc.). The resin system may interact with the thixotrope additives in the formation of a large structure or network. This interaction may be through a variety of mechanisms, such as hydrogen bonding or van der Waal forces.

Due to the low surface energy exhibited by the silicone membrane upon which the ink is printed in a MIT printing process, the ink must be solvent-borne by nature. An ink whose solvent system is primarily water will not satisfactorily wet the surface of the membrane, thereby, causing crawling or contraction of the applied print, resulting in a defect and ultimately a high scrap rate. The solvents that may be used in an ink include any hydrocarbon solvent, such as an aliphatic hydrocarbon, an aromatic hydrocarbon (e.g., toluene, xylene, etc.), a naphthenic hydrocarbon, a chlorinated hydrocarbon, terpene, ketones, esters, glycol ethers, alcohols, nitroparaffins, acetates, and furan solvents (e.g., tetrahydrofuran, etc.) among others known to those skilled in the art.

The solvent system for an ink is selected based on several factors, such as resin solvency and evaporation rate. The solvent system preferably represents a mixture of solvents exhibiting both the ability to dissolve the resin and establish a predetermined evaporation rate. If the evaporation rate is too slow, the resulting film will exhibit defects due to sagging and poor leveling. If the evaporation rate is too fast, the resulting film will suffer from orange peel, pinholes, and blistering. The key to predetermining an evaporation rate is to select at least one solvent with a fast evaporation rate, one solvent or diluent with a medium evaporation rate, and one solvent with a slow evaporation rate. Thus, each of the selected solvents preferably evaporates at different rates from one another in order to maintain resin solvency during film formation and curing. Solvent evaporation rates (ER) are normally measured with reference to n-butyl acetate (ER=1.0). Thus, medium evaporating solvents exhibit an ER between about 0.8 and 3.0, while fast evaporating solvents and slow evaporating solvents exhibit an ER that is less than about 3.0 and greater than about 0.8, respectively.

After the initial selection of the solvent system for an ink formulation, solvent adjustments through the reformulation of this ink are well known by those skilled in the art to be made based upon their tests and measurements made in relation to forming, drying, and curing, the film. These tests and measurements can be made by techniques (e.g., ASTM D1640, ASTM D3539, ASTM D5010, ASTM D5909, and ASTM D6073) well documented in the art.

Opacity and color enhancing pigments or extender fillers may be inorganic in nature, such as alumina, silica, titanium dioxide, magnesium silicate (talc), barium sulfate, calcium carbonate, aluminum silicate (clay), calcium silicate (wollastonite), aluminum potassium silicate (mica), metallic flakes, yellow iron oxide, chromium green oxide, pearlescent pigments, molybdate orange, cadmium orange, etc., or organic in nature, such as furnace black, channel black, and lamp black, copper phtahocyanine blue, dioxazine violet, quinacridone magenta, azo diarylide yellow, perylene red, Indathone blue, carbazole violet, isoindoline yellow, and pyrazolone orange, among others known to those skilled in the art.

Additives to disperse the pigments may be either an ionic or nonionic dispersing agent. Such surfactants include but are not limited to metallic soaps, sulfonates, phosphate esters, fatty acid esters, fluoroaliphatic polymeric esters, titanate or ziconate or aluminate coupling agents, organo-modified polysiloxanes, block copolymers of poly(alkylene oxide), and commercial proprietary surfactants, such as Hypermer® and Solsperse® hyperdispersants (ICI Americas, Inc.).

The nature of the substrate upon which the printed image is transferred in a membrane image transfer printing process includes thermoplastic and thermoset polymeric materials. Preferred polymeric materials include but are not limited to polycarbonate, acrylonitrile-butadiene-styrene copolymers (ABS), thermoplastic polyolefins (TPO), nylon, phenolics, polyesters, polyurethanes, and polyvinyl chloride (PVC) or mixtures or copolymers thereof. The substrate may also be comprised of glass, wood, or metals in whole or in part provided the surface of the substrate is curved or complex in shape.

The following specific examples are given to illustrate the invention and should not be construed to limit the scope of the invention.

EXAMPLE 1

Preparation of Ink Formulation(s)

Six commercial screen printing and five commercial pad printing inks were identified for characterization. Each of these inks was selected due to their ability to adhere to plastic substrates. A total of 250 grams of each ink system was prepared by adding to the ink an appropriate amount of a solvent (retarder or thinner) according to the manufacturer's directions. Table 4 describes the composition of each thermal curable ink. One additional screen printing ink system (ink # SC-7) was prepared as a 4:1 mixture of two other screen printing inks, namely ink #s SC-1 and SC-4. These two inks were mixed together under low shear conditions to create the new formulation (ink # SC-7). Each of the screen printing (ink #s SC-1 to SC-7) and pad printing (ink #s PD-1 to PD-5) ink systems was used in the subsequently described examples for identifying the rheological properties preferred for membrane image transfer printing.

TABLE 4

| | Ink ID (Resin Composition) | Manufacturer | Additive Type | Ink Amount (grams) | Additive Amount (grams) |
|---|---|---|---|---|---|
| | | Screen (SC) Printing Inks | | | |
| SC-1 | Noriphan HTR-952 (polycarbonate) | Proell KG (Switzerland) | 10% 097/003 retarder | 227.3 | 22.7 |
| SC-2 | HG-N501 (acrylic) | Coates Screen (Illinois) | 10% UV2 retarder | 227.3 | 22.7 |
| SC-3 | PUR-ZK948 (vinyl-PVC) | Proell KG (Switzerland) | 10% U90 thinner | 227.3 | 22.7 |
| SC-4 | 8452 Series (polyester) | Nazdar Inc. (Kansas) | 10% RE196 retarder | 227.3 | 22.7 |
| SC-5 | 8852 Series (vinyl) | Nazdar Inc. (Kansas) | 15% RE183 retarder | 217.4 | 32.6 |
| SC-6 | 70111 Series (acrylic) | Nazdar Inc. (Kansas) | 10% 70180 thnner | 227.3 | 22.7 |
| SC-7 | 80% SC-1 (polycarbonate) | Proell KG (Switzerland) | 10% 097/003 retarder | 181.8 | 18.2 |
| | 20% SC-4 (polyester) | Nazdar Inc. (Kansas) | 10% RE196 retarder | 45.5 | 4.5 |
| | | Pad (PD) Printing Inks | | | |
| PD-1 | PUR-ZK948 (vinyl-PVC) | Proell KG (Switzerland) | 30% 6601 thinner | 192.3 | 57.7 |
| PD-2 | KS-U (acrylic-PVC) | Proell KG (Switzerland) | 30% 6601 thinner | 192.3 | 57.7 |
| PD-3 | Tampastar TPR (acrylic) | Marabuwerke GmbH & Co. KG (Germany) | 10% TPV thinner | 227.3 | 22.7 |
| PD-4 | STE (vinyl polyester) | Innovative Marketing Systems (Massachusetts) | 10% R2 retarder | 227.3 | 22.7 |
| PD-5 | 450JK (acrylic) | Rucco Druckfarben (Germany) | 15% 38472 thinner | 217.4 | 32.6 |

EXAMPLE 2

Compatibility with Membrane Image Transfer (MIT) Printing

The ink formulations prepared in Example 1 were subjected to Membrane Image Transfer (MIT) printing under identical conditions utilizing two different transfer time sequences. The MIT printing apparatus used to apply the print to a polycarbonate substrate is described in U.S. patent publication #2003-0116047. A 200 mesh screen with a 17

Newton tension was utilized to apply the print to a flexible silicone membrane. The atmospheric temperature was about 25° C. with a relative humidity varying between 46 to 61%. The time (TH) between the application of the print onto the membrane and the initiation of the transfer of the print from the membrane to the substrate was varied between two settings, either 15 seconds or 35 seconds. Although the transfer pressure was maintained in all runs at about 40 psi, the print transfer time (PTT) was also varied between two settings, namely, either 10 seconds or 25 seconds. Thus the overall time (TH+PTT) between the application of the print onto the membrane and the completion of the print transfer to the substrate was performed either at 25 seconds (15+10) or 60 seconds (35+25).

The printing capability of each ink was measured via determining the percentage of ink transfer, the thickness of the print, the opacity of the print, the adhesion of the print, and optical inspection for image fidelity (e.g., dot loss/gain, edge sharpness, logo clarity, etc.). Percent Image Transfer was performed using Paint Shop Pro 8 software for picture conversion, Image(J) software for Image Analysis, and Microsoft Excel software for numerical calculation of the transfer percentage. Photographs were first taken both before and after image transfer. These pictures were then modified in Paint Shop Pro 8 to remove any glare and to convert them from color into a gray scale (2-bit pictures). Once all pictures were converted, Image(J) software was used to compare the full printed image area (prior to transfer) with that of the area of an image of any residue remaining on the membrane after transfer. Finally, the area values obtained via Image(J) software was used to calculate the transfer percentage in Microsoft Excel. In order to minimize the down-time associated with having to clean the printing apparatus a minimum amount of 98.0% of the ink is preferred to be transferred from the membrane to the part being printed. Thus any measurement less than 98% was considered a failure.

The thickness of the print was obtained via standard profilometry. A surface texture measuring instrument (Surfcom 1400D, Tokyo Seimitsu Co., Ltd.—distributed by C. Zeiss, Germany) using a conical stylus (2 μm tip) was used to obtain a measurement of the ink thickness. The movement (0.33 mm/sec) of the stylus was initiated on the polycarbonate substrate to establish a baseline. The continuation of the stylus over the printed image resulted in the measurement of a step height corresponding to the thickness of the ink. The thickness of the print to enhance opacity and minimize any adverse affect on the application of a protective overcoat to the printed part was known to be between 4.0 μm and 9.0 μm. Thus any thickness measurement less than 4.0 μm or greater than 9.0 μm was considered a failure.

The opacity of the print was obtained via adaptation to the standard light transmission measurement technique specified in ASTM D1003. A Hazegard Plus (BYK-Gardner, Germany) instrument was utilized to obtain the light transmittance measurement. The opacity was then obtained by the simple subtraction of the measured light transmission percentage from 100%. The overall opacity of the print is expected to about 99.85% to minimize any unacceptable perception by the consumer regarding the quality of the print. Thus any print exhibiting an opacity less than 99.85% was determined to fail this test.

The measurement of adhesion retention was obtained using the protocol described by ASTM D3359-95. Since the ink is expected to tenaciously adhere to the substrate upon which it is printed, a retention of a least 99.0% is expected after being subjected to this standard cross-hatch/tape pull test.

The measurement of image fidelity was done via optical inspection. An arbitrary scale of 1 to 10 was utilized to record the overall image rating taking into account dot size loss/gain, logo clarity, and edge resolution. Dot size loss/gain was evaluated using optical microscopy at 5× magnification on an Olympus microscope (model BX60). The rating of 10 was given if no dot size loss/gain and a very well defined logo and edges were observed. Thus a rating of 10 was the best rating possible. Lower ratings were given to parts that exhibited dot loss/gain, incompletely defined structure in the logo and ragged, smudged, or overlapping edges. The rating of 1 represented the lowest possible rating. A passing rating for this test was determined to be a rating no less than 7.

A summary of Pass/Fail against the criteria described above for each of the 12 different ink samples prepared in Example 1 is adequately described in Table 1. All of the measured data obtained for each ink that resulted in the Pass/Fail determination described in Table 1 is provided in Table 5.

TABLE 5

| | Ink Transfer (%) | | Print Thickness (μm) | | Opacity (%) | | Adhesion (Retention %) | | Print Resolution (1–10 scale) | | |
|---|---|---|---|---|---|---|---|---|---|---|---|
| | 25 sec PTT; 35 sec TH | 10 sec PTT; 15 sec TH | 25 sec PTT; 35 sec TH | 10 sec PTT; 15 sec TH | 25 sec PTT; 35 sec TH | 10 sec PTT; 15 sec TH | 25 sec PTT; 35 sec TH | 10 sec PTT; 15 sec TH | 25 sec PTT; 35 sec TH | 10 sec PTT; 15 sec TH | |
| SC-1 | 99.96 | 99.97 | 4.85 | 4.25 | 99.88 | 99.97 | 100.0 | 100.0 | 10 | 10 | Pass |
| SC-2 | 95.99 | 81.26 | 5.89 | 4.07 | 100.00 | 99.28 | 100.0 | 100.0 | 5 | 5 | Fail |
| SC-3 | 100.00 | 99.96 | 6.26 | 7.59 | 99.86 | 99.99 | 100.0 | 100.0 | 7 | 7 | Pass |
| SC-4 | 99.90 | 99.60 | 4.16 | 4.86 | 100.00 | 100.00 | 100.0 | 100.0 | 7 | 7 | Pass |
| SC-5 | 99.96 | 97.11 | 3.37 | 4.04 | 99.95 | 99.95 | 100.0 | 100.0 | 5 | 5 | Fail |
| SC-6 | 89.40 | 0.20 | 3.55 | 3.01 | 92.78 | 85.25 | 100.0 | 100.0 | 5 | 5 | Fail |
| SC-7 | 99.99 | 99.87 | 5.09 | 5.49 | 99.96 | 99.97 | 100.0 | 100.0 | 7 | 7 | Pass |
| PD-1 | 97.47 | 99.65 | 6.21 | 5.77 | 99.92 | 99.73 | 0.0 | 0.0 | 7 | 7 | Fail |
| PD-2 | 98.75 | 99.98 | 7.15 | 9.30 | 99.98 | 98.74 | 100.0 | 100.0 | 2 | 2 | Fail |
| PD-3 | 99.65 | 95.40 | 3.78 | 3.28 | 100.00 | 100.00 | 100.0 | 100.0 | 2 | 2 | Fail |
| PD-4 | 99.27 | 98.23 | 8.99 | 8.33 | 100.00 | 100.00 | 100.0 | 100.0 | 7 | 7 | Pass |
| PD-5 | 99.98 | 99.81 | 5.88 | 6.15 | 99.97 | 100.00 | 99.5 | 99.5 | 7 | 7 | Pass |
| | Pass ≥ 98.00% | | 4.00 < Pass < 9.00 | | Pass ≥ 99.85 | | Pass ≥ 99.0 | | Pass ≥ 7 | | 50% Pass |
| | FAIL < 98.00% | | 4.00 ≥ FAIL ≥ 9.00 | | FAIL < 99.85 | | FAIL < 99.0 | | FAIL < 7 | | 50% Fail |

This example demonstrates that 50% of the screen printing and pad printing inks known for their performance in regards to being applied to plastic substrates were found to fail in being successfully applied to a plastic substrate via a MIT printing process. The inks (SC-2, SC-5, SC-6, PD-1, PD-2, & PD-3) that failed to pass the criteria to be successfully applied via a MIT printing process were found to fail in more than one test category. More specifically, each ink was found to fail in at least 3 of the 5 categories. In addition, each of the failed inks was observed to fail at both overall time (25 or 60 seconds TH+PTT) utilized to insure a robust process. The inks (SC-1, SC-3, SC-4, SC-7, PD-4, & PD-5) that passed the criteria for successful application via a MIT printing process were found to pass all of the criteria at both overall time settings.

EXAMPLE 3

Thixotrophy

The performance of all of the formulated screen printing inks (#s SC-1 to SC-7) and pad printing inks (#s PD-1 to PD-5) from Example 1 were characterized in a conventional rheological test called a thixotropic loop test at 25° C. This particular rheological test was performed on a Rheometrics RD-II stress controlled rheometer at 25° C. The test cell geometry was a 40 mm cone & plate with a cone angle of 0.0394 radians and a gap between the cone and plate of 0.0787 mm. The ink was placed into the test cell and conditioned by being subjected to a shear rate of 300 $sec^{-1}$ for 1 minute followed by 3 minutes at a zero shear rate (0 $sec^{-1}$). The test was then initiated via ramping the applied stress up to a maximum of 10,000 $dynes/cm^2$. A total of 50 measurements were taken over the 20 seconds to slowly ramp the applied stress in the first zone (up-curve). A similar sequence was then followed by ramping the applied stress (10,000 $dynes/cm^2$) down to a natural resting state (0 $dynes/cm^2$) in the second zone (down-curve) over a 20 second period. Each measurement consisted of recording the shear rate ($sec^{-1}$) established, the shear stress ($dynes/cm^2$) applied, the resulting strain (%), the torque (gm-cm), the resulting viscosity (Poise), and the temperature (° C.). An example of the thixotropic loop obtained for ink # PD-1 upon plotting shear stress versus shear rate is shown in FIG. 4.

The magnitude of the thixotropic network is predicted based upon the area of each thixotropic loop. In essence, a large area encompassed by the loop corresponds to a large thixotropic network. This area was mathematically determined via integration for each screen printing and pad printing ink as shown in Table 6. In general, the magnitude of the thixotropic network of pad printing inks is much greater than that exhibited by screen printing inks. In the ink samples evaluated in this example, the average area encompassed by the thixotropic loop was approximately 2 times greater for pad printing inks than for screen printing inks.

TABLE 6

| | Thixotropic Loop | | | Power Law T = b($\gamma^m$) T = Torque; $\gamma$ = shear rate Torque curve fit as function of shear rate | | | |
|---|---|---|---|---|---|---|---|
| | Area (dynes/cm$^2$-sec$^{-1}$) | b (constant) | m (exponent) | Curve Fit $R^2$ | T (gm-cm) at $\gamma$ = 10 sec$^{-1}$ | T (gm-cm) at $\gamma$ = 100 sec$^{-1}$ | T (gm-cm) at $\gamma$ = 1000 sec$^{-1}$ |
| SC-1 | 1.6E+05 | 1.0940 | 0.8450 | 0.9994 | 7.7E+00 | 5.4E+01 | 3.7E+02 |
| SC-2 | 1.4E+05 | 2.1412 | 0.6848 | 0.9932 | 1.0E+01 | 5.0E+01 | 2.4E+02 |
| SC-3 | 2.0E+05 | 4.7718 | 0.6576 | 0.9977 | 2.2E+01 | 9.9E+01 | 4.5E+02 |
| SC-4 | 1.9E+05 | 2.4344 | 0.6966 | 0.9967 | 1.2E+01 | 6.0E+01 | 3.0E+02 |
| SC-5 | 7.4E+05 | 0.8035 | 0.7379 | 0.9981 | 4.4E+00 | 2.4E+01 | 1.3E+02 |
| SC-6 | 3.0E+04 | 1.3264 | 0.8672 | 0.9986 | 9.8E+00 | 7.2E+01 | 5.3E+02 |
| SC-7 | 4.8E+04 | 0.9191 | 0.8183 | 0.9987 | 6.0E+00 | 4.0E+01 | 2.6E+02 |
| Average | 2.2E+05 | 1.9272 | 0.7582 | 0.9975 | 1.0E+01 | 5.7E+01 | 3.3E+02 |
| PD-1 | 1.7E+06 | 0.9434 | 0.6788 | 0.9981 | 4.5E+00 | 2.1E+01 | 1.0E+02 |
| PD-2 | 6.6E+04 | 0.0455 | 0.9367 | 0.9971 | 3.9E−01 | 3.4E+00 | 2.9E+01 |
| PD-3 | 6.6E+05 | 1.1176 | 0.6620 | 0.9977 | 5.1E+00 | 2.4E+01 | 1.1E+02 |
| PD-4 | 3.8E+05 | 1.0100 | 0.7868 | 0.9993 | 6.2E+00 | 3.8E+01 | 2.3E+02 |
| PD-5 | 5.0E+04 | 1.7633 | 0.8139 | 0.9986 | 1.1E+01 | 7.5E+01 | 4.9E+02 |
| Average | 5.7E+05 | 0.9760 | 0.7756 | 0.9982 | 5.5E+00 | 3.2E+01 | 1.9E+02 |

The magnitude of the thixotropic network present in an ink is an important parameter in defining a preferred ink for utilization in membrane image transfer (MIT) printing. As shown in Example 2, the ink formulations (ink #s SC-1, SC-3, SC-4, SC-7, PD-4, and PD-5) that provided the greatest print resolution and the amount (%) of ink transferred from the membrane to a plastic substrate all exhibited a thixotropic loop area between 35,000 dynes/cm$^2$-sec$^{-1}$ to 600,000 dynes/cm$^2$-sec$^{-1}$. In addition, ink # SC-2 and Ink # PD-2 were also found to exhibit a thixotropic loop area with in the range. This example demonstrates that about 33% of inks exhibit a thixotropic network magnitude that is outside the range for use in a MIT printing process.

The thixotropic loop results can be further analyzed with respect to the strength of the thixotropic network in each ink. For this measurement, the Torque applied to each test sample is plotted as a function of shear rate. Each curve was then fit to a Power law function. The $R^2$ for each curve fit was greater than 0.99 as shown in Table 6. This analysis demonstrates that a greater amount of torque must be applied to screen printing inks than pad printing inks in order to establish a specific shear rate level. For instance in order to achieve a shear rate of 100 sec$^{-1}$, the average torque applied to screen printing inks is about 57 gm-cm, while the torque to reach this shear rate level for pad printing inks is on the order of 35 gm-cm. The difference between the various inks in this analysis indicates a difference in the strength of the thixotropic network. The thixotropic network for screen printing inks is typically stronger than the network established in pad printing inks.

The strength of the thixotropic network present in an ink is an important parameter in defining a preferred ink for utilization in membrane image transfer (MIT) printing. As shown in Example 2, the ink formulations (#s SC-1, SC-3, SC-4, SC-7, PD-4, and PD-5) that provided the greatest print resolution and the amount (%) of ink transferred from the membrane to a plastic substrate all exhibited a level of torque to achieve 100 sec$^{-1}$ greater than or equal to 35 gm-cm. In addition, ink #s SC-2 and SC-6 were also found to exhibit a torque level with in the range. This example demonstrates that about 33% of available screen or pad printing inks (ink #s SC-5, PD-1, PD-2, & PD-3) may require the application of a torque to reach 100 sec$^{-1}$ that is outside the range for use in a MIT printing process.

EXAMPLE 4

Creep Compliance and Recovery

The performance of all of the formulated screen printing inks (#s SC-1 to SC-7) and pad printing inks (#s PD-1 to PD-5) from Example 1 were characterized in a conventional rheological test called a creep compliance-relaxation test at 25° C. This particular rheological test was performed on a Rheometrics RD-II stress controlled rheometer at 25° C. The test cell geometry was a 40 mm cone & plate with a cone angle of 0.0394 radians and a gap between the cone and plate of 0.0787 mm. The ink was placed into the test cell and conditioned by being subjected to a shear rate of 300 sec$^{-1}$ for 1 minute followed by 3 minutes at a zero shear rate (0 sec$^{-1}$). The test was then initiated by applying a stress of 10 dynes/cm$^2$ to the ink. A total of 200 measurements were taken over a period of 30 seconds in the first zone (creep curve). A similar sequence was then followed by removing the applied stress (0 dynes/cm$^2$) in the second zone (recovery curve). A total of 200 measurements were taken in this zone over a 300 second period. Each measurement consisted of recording the shear rate (sec$^{-1}$) established, the compliance J(t) (cm$^2$/dynes), time (seconds), the torque (gm-cm), and the resulting viscosity (Poise).

A quantitative comparison between the screen and pad printing inks can be obtained via linear regression of the compliance measurements over the time interval 15 seconds to 30 seconds (see FIG. 5). The slope of the resulting line represents the shear rate established via the application of the constant stress. Calculation of the creep viscosity is then possible from the simple ratio of stress (10 dynes/cm$^2$) to shear rate (sec$^{-1}$) as shown in Table 7. In general, at the low shear rates (10$^{-1}$ to 10$^{-5}$ sec$^{-1}$) established in the creep test, screen printing inks are observed to exhibit a much greater viscosity level. More specifically, the average viscosity of the screen printing inks was observed to be on the order of 76,000 Poise as compared to 2,100 Poise for pad printing inks.

TABLE 7

| | Linear Curve Fit Y = mX + b Y = J(t) X = time, seconds | | | | | |
|---|---|---|---|---|---|---|
| | m (shear rate, sec^-1) | b (constant) | Curve Fit R$^2$ | J(t) compliance at 30 seconds (cm$^2$/dynes) | creep viscosity (Poise) | Recovery (%) |
| SC-1 | 1.29E−04 | 4.22E−03 | 1.0E+00 | 8.1E−03 | 7.8E+04 | 51.2% |
| SC-2 | 3.00E−05 | 6.00E−03 | 9.9E−01 | 6.9E−03 | 3.3E+05 | 44.3% |
| SC-3 | 9.08E−04 | 1.58E−02 | 1.0E+00 | 4.3E−02 | 1.1E+04 | 51.8% |
| SC-4 | 1.75E−04 | 5.65E−03 | 9.8E−01 | 1.1E−02 | 5.7E+04 | 25.1% |
| SC-5 | 2.83E−04 | 1.83E−02 | 9.9E−01 | 2.7E−02 | 3.5E+04 | 16.5% |
| SC-6 | 9.74E−03 | 3.92E−02 | 1.0E+00 | 3.3E−01 | 1.0E+03 | 1.2% |
| SC-7 | 7.23E−04 | 8.23E−03 | 1.0E+00 | 3.0E−02 | 1.4E+04 | 26.9% |
| Average | 1.71E−03 | 1.39E−02 | 9.9E−01 | 6.5E−02 | 7.6E+04 | 31.0% |
| PD-1 | 1.08E−02 | 1.05E−01 | 1.0E+00 | 4.3E−01 | 9.3E+02 | 12.4% |
| PD-2 | 6.12E−01 | 3.43E−01 | 1.0E+00 | 1.9E+01 | 1.6E+01 | 0.8% |
| PD-3 | 7.95E−03 | 6.58E−02 | 1.0E+00 | 3.0E−01 | 1.3E+03 | 12.0% |
| PD-4 | 1.37E−03 | 4.20E−02 | 9.9E−01 | 8.3E−02 | 7.3E+03 | 13.6% |
| PD-5 | 1.11E−02 | 1.80E−02 | 1.0E+00 | 3.5E−01 | 9.0E+02 | 8.5% |
| Average | 1.29E−01 | 1.15E−01 | 1.0E+00 | 4.0E+00 | 2.1E+03 | 9.5% |

The viscosity exhibited by an ink at low shear rates (about 10$^{-1}$ to 10$^{-5}$ sec$^{-1}$) is an important parameter in defining a preferred ink for utilization in membrane image transfer (MIT) printing. As shown in Example 2, the ink formulations (#s SC-1, SC-3, SC-4, SC-7, PD-4, & PD-5) that provided the greatest print resolution and the amount (%) of ink transferred from the membrane to a plastic substrate all exhibited a viscosity level at low shear rates that was between 8.0×10$^2$ and 9.0×10$^4$ Poise. Ink #s SC-2 and PD-2 were found to exhibit a creep viscosity outside the range. This example demonstrates that about 17% of inks exhibit a viscosity at low shear rates that is outside the range for use in a MIT printing process.

The creep test results can be further analyzed with respect to the extent of recovery response for each ink. For this analysis, the measurements taken after the applied stress was removed for each test sample was compared against the initial compliance value prior to the application of the 10 dynes/cm$^2$ stress. The calculation of the percent recovery for each ink after 300 seconds at rest (stress=0 dynes/cm$^2$) is shown in Table 7. This analysis demonstrates that screen printing inks recover to a much greater percent than pad printing inks. The average recovery response for screen printing inks was observed to be on the order of 31% as compared to only about 10% for pad printing inks.

The creep recovery response exhibited by an ink is an important parameter in defining a preferred ink for utilization in membrane image transfer (MIT) printing. As shown in Example 2, the ink formulations (#s SC-1, SC-3, SC-4, SC-7, PD-4, & PD-5) that provided the greatest print resolution and the amount (%) of ink transferred from the membrane to a plastic substrate all exhibited a recovery percentage greater than about 5%. Ink #s SC-6 and PD-2 were found to exhibit a recovery percentage outside the range. This example demonstrates that about 17% of the inks exhibit an elastic recovery (%) that is outside the range for use in a MIT printing process.

EXAMPLE 5

Dynamic Frequency (Time Dependency)

The performance of all of the formulated screen printing inks (#s SC-1 to SC-7) and pad printing inks (#s PD-1 to PD-5) from Example 1 were characterized in a conventional rheological test called a dynamic frequency sweep test at 25° C. This particular rheological test was performed on a Rheometrics RD-II stress controlled rheometer at 25° C. The test cell geometry used for all tests except one was a 40 mm cone & plate with a cone angle of 0.0394 radians and a gap between the cone and plate of 0.0787 mm. The test cell for ink # PD-2 was a couette cell with a cup diameter of 32 mm, a bob diameter of 29.5 mm (gap=2.5 mm), and a bob length of 44.25 mm. Each ink was placed into the corresponding test cell and conditioned by being subjected to a shear rate of 300 $sec^{-1}$ for 1 minute followed by 3 minutes at a zero shear rate (0 $sec^{-1}$). Each test was then initiated with the application of a stress equal to 1.0 dynes/$cm^2$ at an initial frequency of 100 radians/second. The stress level was held constant while the frequency was decreased to a final frequency level of 0.1 radians/second for tests run with either the cone & plate cell or the couette cell. A total of 10 data points per decade on a logarithmic sweep mode were measured. Each measurement consisted of recording the frequency (radians/second), storage modulus (G', dynes/$cm^2$), loss modulus (G", dynes/$cm^2$), tan δ (ratio of G"/G'), strain (%), complex viscosity (Poise), and phase angle (degrees).

An example of a plot of storage modulus, loss modulus, complex viscosity, and tan δ as a function of frequency is shown in FIG. 6 for ink # PD-4. The average tan δ was calculated from the measured storage and loss moduli over the entire frequency range as shown in Table 8. As shown in Example 2, the ink formulations (#s SC-1, SC-3, SC-4, SC-7, PD-4, & PD-5) that provided the greatest print resolution and the amount (%) of ink transferred from the membrane to a plastic substrate all exhibited a tan δ ranging between 1 and 3. Ink #s SC-2, SC-5, and PD-2 were found to exhibit a tan δ outside the range. This example demonstrates that about 25% of the inks exhibit a tan δ that is outside the range for use in a MIT printing process.

This example further demonstrates that the storage modulus is the dominant component over the specified frequency range for inks that are suitable for use in a MIT printing process. In other words, the value of loss modulus, G", at any given frequency will typically be larger than the value of the corresponding storage modulus, G', measured at that same frequency. This trend is observed in both the Tan δ for each ink, as well as described in detail for one ink (# PD-4) shown in FIG. 6. Two inks, #s SC-3 and SC-4 were found to exhibit some dependence on shear history in that the magnitude of G' exceeded that of G" at a certain frequency level. This phenomenon indicates that a specific type of intermolecular interaction called entanglement is present in these particular ink formulations. This type of interaction still meets the requirements for use in a MIT printing process due to its weak nature.

TABLE 8

| | Dynamic Frequency Sweep | | |
|---|---|---|---|
| | G' vs G" Dominant at 25° C. | Tan δ | Interpetation of Data |
| SC-1 | G" (viscous) | 1.37 | Weakly associated, flocculated structure |
| SC-2 | G' (elastic) | 0.66 | Highly structured - physical gel |
| SC-3 | G'→G" | 1.39 | History dependent - ink is changing (e.g., entanglement, weakly structured) |
| SC-4 | G"→G'→G" | 1.12 | History dependent - ink is changing (e.g., entanglement, weakly structured) |
| SC-5 | G' (elastic) | 0.53 | Highly structured - physical gel |
| SC-6 | G" (viscous) | 7.45 | Very weak or non-associated structure |
| SC-7 | G" (viscous) | 1.50 | Weakly associated, flocculated structure |
| PD-1 | G" (viscous) | 1.80 | Weakly associated, flocculated structure |
| PD-2 | G' (elastic) | 0.02 | Highly structured - physical gel |
| PD-3 | G" (viscous) | 2.69 | Weakly associated, flocculated structure |
| PD-4 | G" (viscous) | 1.45 | Weakly associated, flocculated structure |
| PD-5 | G" (viscous) | 4.45 | Very weak or non-associated structure |

EXAMPLE 6

Steady State Stress Sweep

The performance of all of the formulated screen printing inks (#s SC-1 to SC-7) and pad printing inks (#s PD-1 to PD-5) from Example 1 were characterized in a conventional rheological test called a steady state stress sweep. This particular rheological test was performed on a Rheometrics RD-II stress controlled rheometer at 25° C. The test cell geometery for all tests except one was a 40 mm cone & plate with a cone angle of 0.0394 radians and a gap between the cone and plate of 0.0787 mm. The test cell for ink # PD-2 was a couette cell with a cup diameter of 32 mm, a bob diameter of 29.5 mm (gap=2.5 mm), and a bob length of 44.25 mm. Each ink was placed into the test cell and conditioned by being subjected to a shear rate of 300 $sec^{-1}$ for 1 minute followed by 3 minutes at a zero shear rate (0 $sec^{-1}$). Each test was then initiated with an initial stress of 1.0 dynes/$cm^2$ being applied. The final stress applied to each ink sample was 29,264 dynes/$cm^2$ for the cone & plate cell and 8,106 dynes/$cm^2$ for the couette cell with ten data points being taken per decade through the logarithmic stress sweep. The maximum time for the collection of each data point was set to 30 seconds.

This particular rheological test is useful in determining the static yield stress and shear thinning characteristics for non-Newtonian fluids, as well as to predict the viscosity profile of each fluid at relatively high shear rates. The static yield stress of a pigment filled fluid, such as an ink, is defined as the level of stress applied to the ink that causes the ink to flow or "yield". This value can be empirically obtained by plotting the measured viscosity of the ink as a function of shear stress as shown in FIG. 7. At low levels of applied stress or prior to yielding, the measured viscosity will increase until a peak is reached at the yield stress point. Upon the application of a stress level surpassing this static yield point, the viscosity of the ink will decrease as expected for a shear-thinning, non-Newtonian fluid. This empirical method was used to determine the yield stress for each screen printing and pad printing ink formulated in Example 1. As shown in Table 9, screen printing inks exhibit a static yield stress that is greater than that exhibited by pad printing inks. On average, the static yield stress exhibited by screen printing inks is 27.1 dynes/$cm^2$ as compared to 16.1 dynes/$cm^2$ for pad printing inks.

Static yield stress is an important parameter in defining a preferred ink for utilization in membrane image transfer (MIT) printing. As shown in Example 2, the six ink formulations, namely, #s SC-1, SC-3, SC-4, SC-7, PD-4, & PD-5, that provided the print resolution and the amount (%) of ink transferred from the membrane to a plastic substrate in a MIT process all exhibited a static yield stress within the range of 1.0 dynes/cm$^2$ to 50.0 dynes/cm$^2$. In addition, inks identified as #s SC-2, SC-5, SC-6, and PD-1 also exhibited a static yield stress with in the range. This example demonstrates that about 17% of existing inks will fall outside the specified range.

of the ink at a shear stress level of 10,000 dynes/cm$^2$. Thus a higher value in this simple ratio represents a higher degree of shear-thinning in the viscosity exhibited by the ink. The average shear thinning ratio for screen printing inks is approximately an order of magnitude greater than the ratio exhibited by pad printing inks. As shown in Example 2, the ink formulations (#s SC-1, SC-3, SC-4, SC-7, PD-4, & PD-5) that provided the print resolution and the amount (%) of ink transferred from the membrane to a plastic substrate all exhibited a viscosity less than or equal to 34 Poise at a shear stress of 10,000 dynes/cm$^2$ and a shear thinning ratio between 4.0 and 6,000.

TABLE 9

Power Law $\eta = b(\tau^m)$ $\eta$ = Viscosity; $\tau$ = shear stress (Viscosity Curve Fit for > Yield Point)

| | Yield Stress (dynes/cm$^2$) | b (constant) | m (exponent) | Curve Fit R$^2$ | $\eta$ (Poise) at Static Yield Point | $\eta$ (Poise) at $\tau$ = 1,000 dynes/cm$^2$ | $\eta$ (Poise) at $\tau$ = 2,500 dynes/cm$^2$ | $\eta$ (Poise) at $\tau$ = 5,000 dynes/cm$^2$ | $\eta$ (Poise) at $\tau$ = 10,000 dynes/cm$^2$ | Shear Thinning Ratio |
|---|---|---|---|---|---|---|---|---|---|---|
| SC-1 | 29.3 | 1.1E+05 | −1.0E+00 | 9.4E−01 | 3.8E+03 | 1.1E+02 | 4.2E+01 | 2.1E+01 | 1.0E+01 | 3.6E+02 |
| SC-2 | 14.7 | 1.0E+06 | −1.3E+00 | 9.0E−01 | 2.8E+04 | 1.0E+02 | 3.0E+01 | 1.2E+01 | 4.8E+00 | 5.9E+03 |
| SC-3 | 46.5 | 2.8E+05 | −1.1E+00 | 9.4E−01 | 5.0E+03 | 2.0E+02 | 7.6E+01 | 3.6E+01 | 1.8E+01 | 2.8E+02 |
| SC-4 | 29.3 | 2.0E+06 | −1.5E+00 | 9.0E−01 | 1.5E+04 | 8.8E+01 | 2.3E+01 | 8.6E+00 | 3.1E+00 | 4.8E+03 |
| SC-5 | 23.3 | 6.5E+05 | −1.5E+00 | 8.0E−01 | 6.2E+03 | 2.4E+01 | 6.2E+00 | 2.2E+00 | 7.9E−01 | 7.8E+03 |
| SC-6 | 36.9 | 2.7E+02 | −2.2E−01 | 9.8E−01 | 1.2E+02 | 5.9E+01 | 4.8E+01 | 4.1E+01 | 3.5E+01 | 3.5E+00 |
| SC-7 | 10.0 | 4.4E+04 | −1.2E+00 | 7.9E−01 | 2.7E+03 | 1.0E+01 | 3.3E+00 | 1.4E+00 | 6.1E−01 | 4.4E+03 |
| Average | 27.1429 | 5.8E+05 | −1.1E+00 | 8.9E−01 | 8.6E+03 | 8.4E+01 | 3.3E+01 | 1.8E+01 | 1.0E+01 | 3.4E+03 |
| PD-1 | 11.7 | 1.7E+05 | −7.7E−01 | 9.4E−01 | 2.5E+02 | 8.3E+00 | 4.1E+00 | 2.4E+00 | 1.4E+00 | 1.8E+02 |
| PD-2 | 0.5 | 4.4E−01 | −2.9E−02 | 6.5E−01 | 4.5E−01 | 3.6E−01 | 3.5E−01 | 3.5E−01 | 3.4E−01 | 1.3E+00 |
| PD-3 | 58.5 | 4.3E+03 | −7.2E−01 | 9.3E−01 | 2.3E+02 | 3.0E+01 | 1.5E+01 | 9.4E+00 | 5.7E+00 | 4.0E+01 |
| PD-4 | 7.9 | 3.0E+04 | −9.9E−01 | 8.4E−01 | 3.9E+03 | 3.3E+01 | 1.3E+01 | 6.6E+00 | 3.3E+00 | 1.2E+03 |
| PD-5 | 2.0 | 2.4E+02 | −2.1E−01 | 9.1E−01 | 2.0E+02 | 5.5E+01 | 4.5E+01 | 3.9E+01 | 3.4E+01 | 6.1E+00 |
| Average | 16.1200 | 7.3E+03 | −5.4E−01 | 8.5E−01 | 9.2E+02 | 2.5E+01 | 1.6E+01 | 1.2E+01 | 8.9E+00 | 2.8E+02 |

The steady state shear sweep data can be further analyzed with respect to high shear viscosity and shear-thinning characteristics. After the stress applied to the ink surpasses the yield stress exhibited by the ink, the ink begins to flow. At this point the viscosity begins to decrease with the application of greater and greater shear stress. Hence, the term "shear-thinning" fluid is used to describe the viscosity characteristic exhibited by these non-Newtonian fluids. After surpassing the static yield point the measured viscosity data plotted as a function of shear stress is known to be described by a power law distribution as shown in FIG. 7.

The measured data for each screen printing ink (#s SC-1 to SC-7) and pad printing ink (#s PD-1 to PD-5) was curve fitted to a power law distribution. The power law equation obtained for each ink was used to predict the viscosity of the ink at shear stress values of 1000, 2500, 5000, and 10000 dynes/cm$^2$. As shown in Table 9 the average viscosity exhibited by screen printing inks at shear stress levels below 10000 dynes/cm$^2$ is greater than that exhibited by conventional pad printing inks. For instance, at a stress of 2,500 dynes/cm$^2$, the average viscosity exhibited by screen printing inks is on the order of 33 Poise, while the average viscosity exhibited by pad printing inks is approximately ½ this value at 16 Poise. In addition, the average viscosity exhibited by screen printing and pad printing inks are shown to converge toward 10 Poise at high stress levels (greater than or equal to about 10,000 dynes/cm$^2$).

In general, the viscosity of screen printing inks were found to exhibit a much higher degree of shear thinning as shown in the shear thinning ratio reported in Table 9. This shear thinning ratio represents the ratio of the ink's viscosity immediately after surpassing the yield point to the viscosity

EXAMPLE 7

Property Comparison

The measured results from Examples 3 through Example 6 were compared against the specification generated for an ink being used in a MIT printing process (see Table 2). Each of the inks (Ink #s SC-1, SC-3, SC-4, SC-7, PD-4, & PD-5) that were found to be suitable for use in a MIT printing process (see Table 5) were found to meet all of the criteria specified in Table 2. The inks (Ink #s SC-2, SC-5, SC-6, PD-1, PD-2, & PD-3) that were found not to be suitable (Table 5) for use in a MIT printing process were found to exhibit more than one property outside the limits specified in Table 2. More specifically, each ink that was found to be unsuitable for use in a MIT printing process was observed to exhibit between 2-5 properties out of six specified properties that were outside the limits. A summary of this comparison is found in Table 3. Thus the thixotropic structure established in about 50% of the inks available for either screen printing or pad printing onto plastic substrates were found to be unsuitable for application via a MIT printing process. This example further demonstrates that the inks found to meet the properties for successful use in a MIT printing process contain a variety of different classes of resins, such as polycarbonate (ink # SC-1), vinyl-PVC (ink # SC-3), polyester (ink # SC-4), vinyl-polyester (ink # PD-4), and acrylic (ink #s PD-5), as well as mixtures of various resins, e.g., polycarbonate/polyester mixture (ink # SC-7). Similar resin systems were observed to pass as well as fail in the successful application of a print via MIT processing. For examples, an acrylic system in ink # PD-5 passed all criteria, while similar acrylic resin systems in ink #s SC-2, SC-6, & PD-3 failed to meet the specification.

A person skilled in the art will recognize from the previous description that modifications and changes can be made to the preferred embodiment of the invention without departing from the scope of the invention as defined in the following claims. A person skilled in the art will further recognize that the rheological measurements described in the preferred embodiment are standard measurements that can be obtained by a variety of different test methods. The test methods described in the examples represents only one available method to obtain each of the preferred measurements.

What is claimed is:

1. A method of transferring a membrane image by membrane image transfer to a substrate, the method comprising:
    providing an ink comprising:
        a hydrocarbon solvent having a predetermined evaporation rate;
        a synthetic polymeric resin; and
        a thixotrope for forming a thixotropic network in the ink, the thixotropic network having a thixotropic network magnitude of between $3 \times 10^4$ and $6 \times 10^5$ dynes/cm$^2$-sec$^{-1}$ and a thixotropic network strength of at least 35.0 gm-cm;
    applying a printed decoration of the ink through a screen to a membrane, defining the membrane image on the membrane;
    forming the membrane to the geometry of the surface of the substrate;
    adhering the membrane image to the substrate by pressing the membrane and the substrate together in forced contact;
    maintaining pressure between the membrane and the substrate to transfer the membrane image from the membrane to the substrate; and
    separating the membrane from the substrate.

2. The method of claim 1 further comprising maintaining the membrane and the article in a part fixture.

3. The method of claim 1 wherein the ink containing the thixotropic network has a creep viscosity of between $8 \times 10^2$ to $9 \times 10^4$ poise and a tan ratio δ at least 1.

4. The method of claim 3 wherein the ink containing thixotropic network has a creep recovery of at least 5% and a static yield stress of between 1 and 50 dynes/cm$^2$.

5. The method of claim 1 wherein the hydrocarbon solvent includes at least one of the following:
    an aliphatic hydrocarbon, an aromatic hydrocarbon, a naphthenic hydrocarbon, a chlorinated hydrocarbon, a terpene solvent, an oxygenated solvent, a ketone, an ester, a glycol ether, an acetate, an alcohol, a nitroparaffin, or a furan solvent.

6. The method of claim 1 wherein the thixotrope includes at least one of the following:
    a castor oil derivative, a high molecular weight polyolefin, an attapulgite, a montmorillonite, an organo-clays, a fumed silica, a fibrated mineral, a calcium sulphonate derivative, a polyamide resin, a polyester amide, an alkyds, an oil-modified alkyd, an ionic surfactant agent, or a non-ionic agent.

7. The method of claim 1 wherein the polymeric resin includes at least one of the following:
    a polycarbonate resin, a PVC resin, a polyester resin, an acrylic resin, a vinyl resin, a cellulosic resin, an alkyd resin, a formaldehyde derived resin, an epoxy resin, a polyurethane resin, a silicone resin, a silicate resin, an amino resin, a polyamide resin, a phenolic resin.

8. The method or claim 1 further comprising:
    a pigment dispersed in the ink for opacity or color;
    an additive to disperse the pigment, the additive including a surfactant, a dispersant, or mixtures thereof; and
    a catalyst to initiate cross-linking between polymer chains in the resin.

9. The method of claim 8 wherein the pigment includes at least one of the following:
    alumina, silica, titanium dioxide, magnesium silicate, barium sulfate, calcium carbonate, aluminum silicate, calcium silicate, aluminum potassium silicate, metallic flakes, yellow iron oxide, chromium green oxide, pearlescent pigment, molybdate orange, cadmium orange, furnace black, channel black, and lamp black, copper phtahocyanine blue, dioxazine violet, quinacridone magenta, azo diarylide yellow, perylene red, indathone blue, carbazole violet, isoindoline yellow, or pyrazolone orange.

10. The method of claim 8 wherein the surfactant includes at least one of the following:
    metallic soap, sulfonate, phosphate esters, fatty acid ester, fluoroaliphatic polymeric ester, a titanate coupling agent, a ziconate coupling agent, an aluminate coupling agent, an organomodified polysiloxane, a block copolymers of poly(alkylene oxide), a hyperdispersant, base neutralized fatty alcohol sulfate, a polyamino-amide phosphate, or carboxylic acid.

11. The method of claim 8 wherein the catalyst includes at least one of the following:
    an isocyanate, a metal drier, an acid, a base, or a peroxide.

* * * * *